US012134487B2

(12) United States Patent
Moore et al.

(10) Patent No.: US 12,134,487 B2
(45) Date of Patent: Nov. 5, 2024

(54) ULTRA-QUIET AIRCRAFT

(71) Applicant: Whisper Aero Inc., Crossville, TN (US)

(72) Inventors: Mark Douglass Moore, Crossville, TN (US); Ian Andreas Villa, Crossville, TN (US); Sayer Fisher, Baltimore, MD (US); Devon Jedamski, Crossville, TN (US); Xiaofan Fei, Crossville, TN (US); Andrew Stephen Hahn, Yorktown, VA (US)

(73) Assignee: Whisper Aero Inc., Crossville, TN (US)

( * ) Notice: Subject to any disclaimer, the term of this patent is extended or adjusted under 35 U.S.C. 154(b) by 0 days.

(21) Appl. No.: 18/181,067

(22) Filed: Mar. 9, 2023

(65) Prior Publication Data

US 2024/0002076 A1 Jan. 4, 2024

Related U.S. Application Data

(60) Provisional application No. 63/356,885, filed on Jun. 29, 2022.

(51) Int. Cl.
*B64U 10/25* (2023.01)
*B64C 5/02* (2006.01)
(Continued)

(52) U.S. Cl.
CPC ............ *B64U 10/25* (2023.01); *B64C 5/02* (2013.01); *B64D 29/00* (2013.01); *B64U 20/20* (2023.01); *B64U 50/14* (2023.01); *B64U 2101/30* (2023.01)

(58) Field of Classification Search
CPC .. B64C 5/16; B64C 5/02; B64C 39/04; B64U 10/25
See application file for complete search history.

(56) References Cited

U.S. PATENT DOCUMENTS 3,260,481 A * 7/1966 Winborn, Jr. ............. B64C 3/00
244/218
3,608,850 A * 9/1971 Fredericks ............ B64C 23/005
D12/335
(Continued)

FOREIGN PATENT DOCUMENTS

CN 1118591 A 3/1996
CN 102795333 B 8/2016
(Continued)

OTHER PUBLICATIONS

Taiwan Intellectual Property Office, Office Action w/English Translation of Search Report, Taiwanese Patent Application No. 112108956, Mar. 12, 2024, 10 pages.
(Continued)

*Primary Examiner* — Joshua J Michener
*Assistant Examiner* — Michael B. Kreiner
(74) *Attorney, Agent, or Firm* — Banner & Witcoff, Ltd.

(57) ABSTRACT

A drone is disclosed having a low acoustic signature. The drone includes a fuselage, a main inboard wing attached to the fuselage, a pylon located towards an aft end of the fuselage and having an end that is higher than the main inboard wing, and a propulsor connected to the pylon and situated above the fuselage. The drone includes a plurality of booms connected to the main inboard wing and a plurality of horizontal tails attached to the plurality of booms. The horizontal tails have an outboard tail arrangement and are tiltable.

20 Claims, 22 Drawing Sheets

(51) Int. Cl.
  *B64D 29/00* (2006.01)
  *B64U 20/20* (2023.01)
  *B64U 50/14* (2023.01)
  *B64U 101/30* (2023.01)

(56) References Cited

U.S. PATENT DOCUMENTS

| | | | | |
|---|---|---|---|---|
| 3,884,432 A * | 5/1975 | Blanchard, Jr. | ......... | B64C 21/04 244/55 |
| 4,240,601 A * | 12/1980 | Reed | ......... | B64U 10/50 244/158.9 |
| 4,538,779 A * | 9/1985 | Goldstein | ......... | B64C 5/10 244/76 R |
| 4,746,082 A * | 5/1988 | Syms | ......... | B64D 47/08 343/705 |
| 5,035,382 A | 7/1991 | Lissaman et al. | | |
| 5,188,313 A * | 2/1993 | Piasecki | ......... | B64D 3/00 244/3 |
| 5,395,073 A * | 3/1995 | Rutan | ......... | B64C 39/04 244/38 |
| 5,765,777 A * | 6/1998 | Schmittle | ......... | B64C 29/0033 244/181 |
| 5,863,013 A * | 1/1999 | Schmittle | ......... | B64C 39/04 244/38 |
| 5,941,478 A * | 8/1999 | Schmittle | ......... | B64C 3/385 244/131 |
| 6,086,014 A * | 7/2000 | Bragg, Jr. | ......... | B60F 5/02 244/49 |
| 6,843,450 B2 * | 1/2005 | Bath | ......... | B64C 9/02 244/45 A |
| 7,195,207 B2 * | 3/2007 | Rutan | ......... | B64C 39/04 244/159.1 |
| 7,581,696 B2 * | 9/2009 | Morgan | ......... | B64C 5/06 244/45 R |
| 7,584,923 B2 * | 9/2009 | Burrage | ......... | B64C 29/0033 244/17.23 |
| 8,235,327 B2 * | 8/2012 | Jackson | ......... | A63H 27/02 244/190 |
| 8,333,348 B1 * | 12/2012 | Miller | ......... | B64C 30/12 244/199.4 |
| 9,296,478 B2 * | 3/2016 | Bender | ......... | B64C 39/00 |
| 9,540,100 B2 * | 1/2017 | Dekel | ......... | G05D 1/102 |
| 9,616,995 B2 * | 4/2017 | Watkins | ......... | B64C 27/24 |
| 9,731,818 B2 * | 8/2017 | Dekel | ......... | B64C 29/00 |
| 10,287,011 B2 * | 5/2019 | Wolff | ......... | B64C 29/0033 |
| 10,850,828 B2 * | 12/2020 | Grubb | ......... | B64C 1/26 |
| 10,850,835 B2 * | 12/2020 | Hutson | ......... | B64C 29/0016 |
| 11,091,259 B2 * | 8/2021 | Pierce | ......... | B60V 1/15 |
| 11,148,800 B2 * | 10/2021 | Hong | ......... | B64C 39/04 |
| 11,312,486 B2 * | 4/2022 | Regev | ......... | B64U 50/20 |
| 11,447,246 B2 * | 9/2022 | Kunz | ......... | B64U 30/40 |
| 11,479,352 B2 * | 10/2022 | McCullough | ......... | B64C 5/02 |
| 11,945,585 B2 * | 4/2024 | Zook | ......... | B64C 29/0025 |
| 2012/0267472 A1 * | 10/2012 | Pratzovnick | ......... | H04K 3/825 244/119 |
| 2022/0315250 A1 * | 10/2022 | Prampolini | ......... | B64G 1/62 |

FOREIGN PATENT DOCUMENTS

| | | |
|---|---|---|
| CN | 110139800 A | 8/2019 |
| JP | 2012245832 A | 12/2012 |

OTHER PUBLICATIONS

PCT International Search Report and Written Opinion, PCT Application No. PCT/IB2023/052270, Jun. 23, 2023, 7 pages.

* cited by examiner

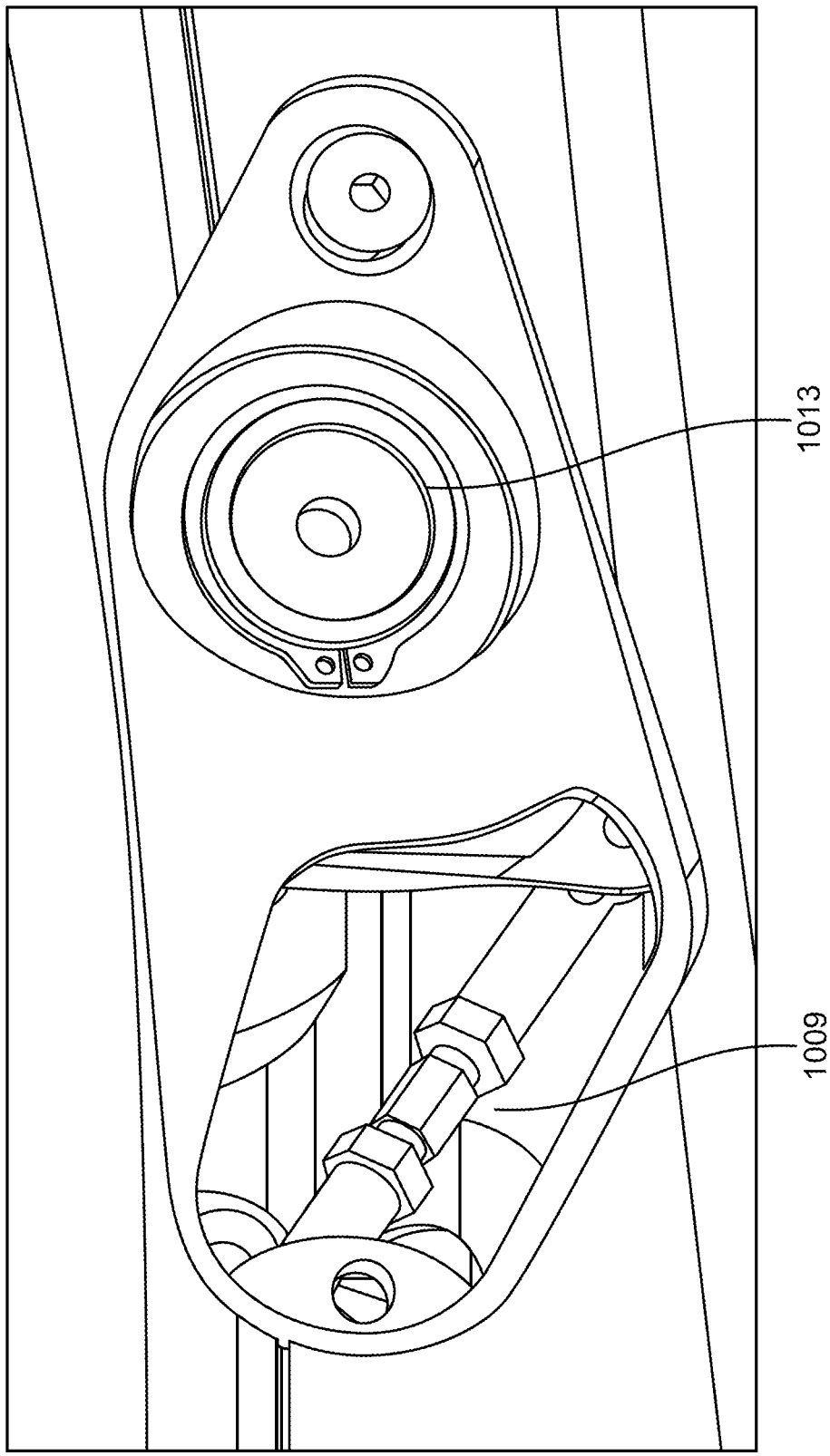

ULTRA-QUIET AIRCRAFT

CROSS-REFERENCE TO RELATED APPLICATION

This application claims the benefit of U.S. Provisional Patent application No. 63/356,885 filed on Jun. 29, 2022 which is incorporated by reference in its entirety.

BACKGROUND

Field of Technology

The present disclosure generally relates to a drone, and more specifically, a drone with reduced noise pollution.

Description of the Related Art

Conventional drones include propulsor fans that typically include open rotors and propellers. These types of conventional drones have reached their acoustic limits. As a result, conventional drones increase noise pollution.

SUMMARY

A drone is described that reduces noise pollution. In one embodiment, the drone comprise a fuselage and a main inboard wing that is attached to an upper surface of the fuselage. A pylon is attached towards an aft end of the fuselage and extends such that an end of the pylon is positioned higher than the main inboard wing. A propulsor that is configured to generate thrust is attached to the end of pylon.

As a result, the propulsor is positioned at a center of lift of the drone to provide acoustic shielding located near the main inboard wing. Noise emanating from the propulsor may primarily point outwards in the direction of a fan face of the propulsor. Due to the placement of the propulsor behind the trailing edge of the main inboard wing, the main inboard wing may provide acoustic shielding at the leading edge side of the wing where a payload may be more closely located.

Furthermore, the drone includes a plurality of booms attached to the main inboard wing. A plurality of empennages are attached to end of the booms. In one embodiment, the empennages have an outboard tail arrangement to reduce wetted area for drag and mass reduction. The horizontal tails are also rotatable to provide longitudinal stability at all phases of flight.

BRIEF DESCRIPTION OF DRAWINGS

FIG. 14B illustrates a first portion of the horizontal tail rotation mechanism accessible through a first access cover, according to an embodiment.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

First Embodiment of Drone Structure

Figure 1A:
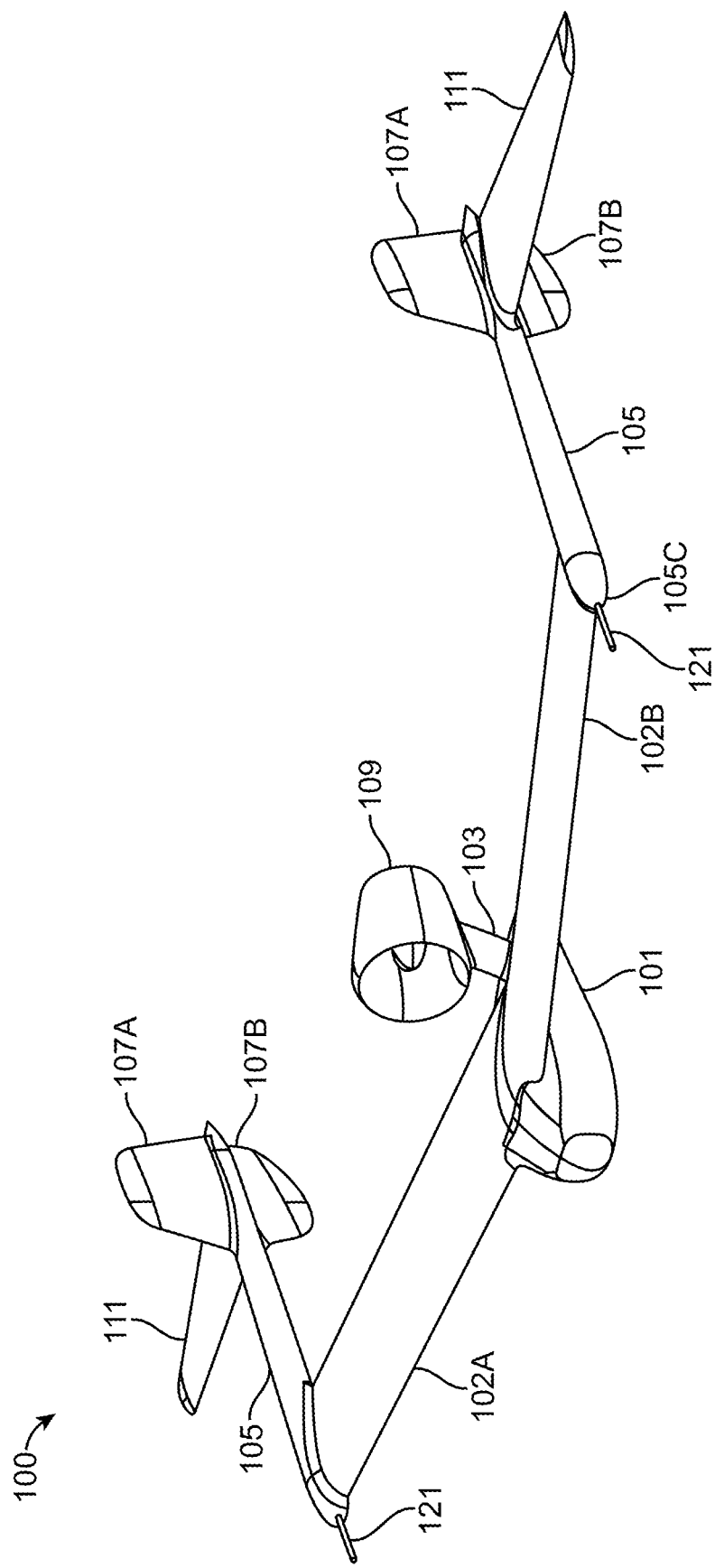
FIG. 1A illustrates a top-front-left perspective view of a drone, according to an embodiment.
Figure 1B:
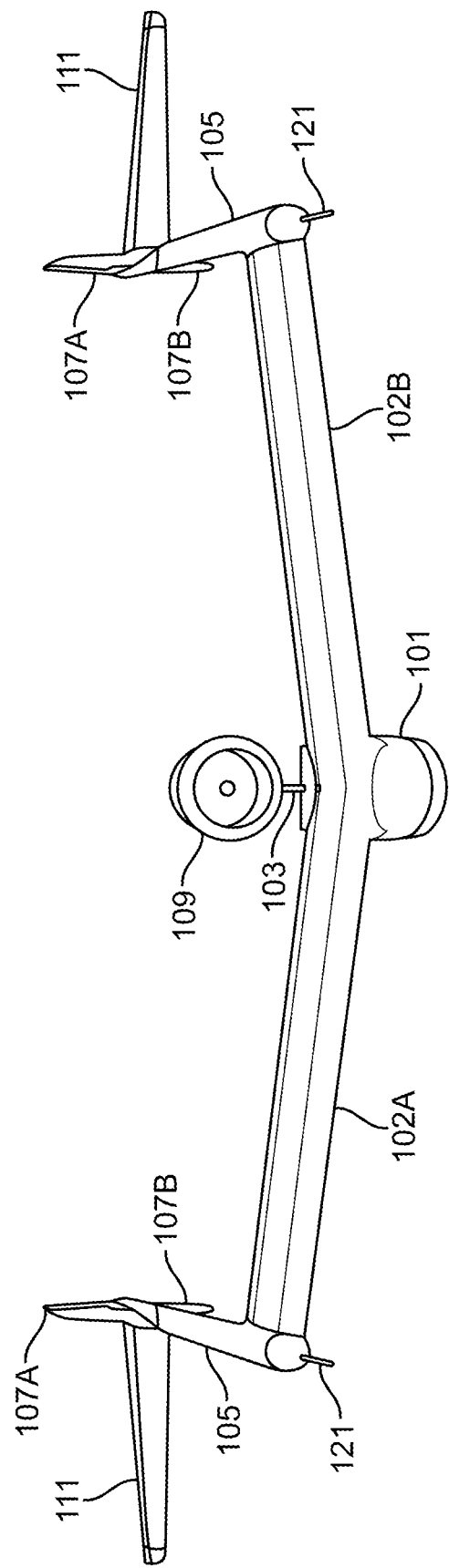
FIG. 1B illustrates a top-front perspective view of the drone, according to an embodiment
Figure 1C:
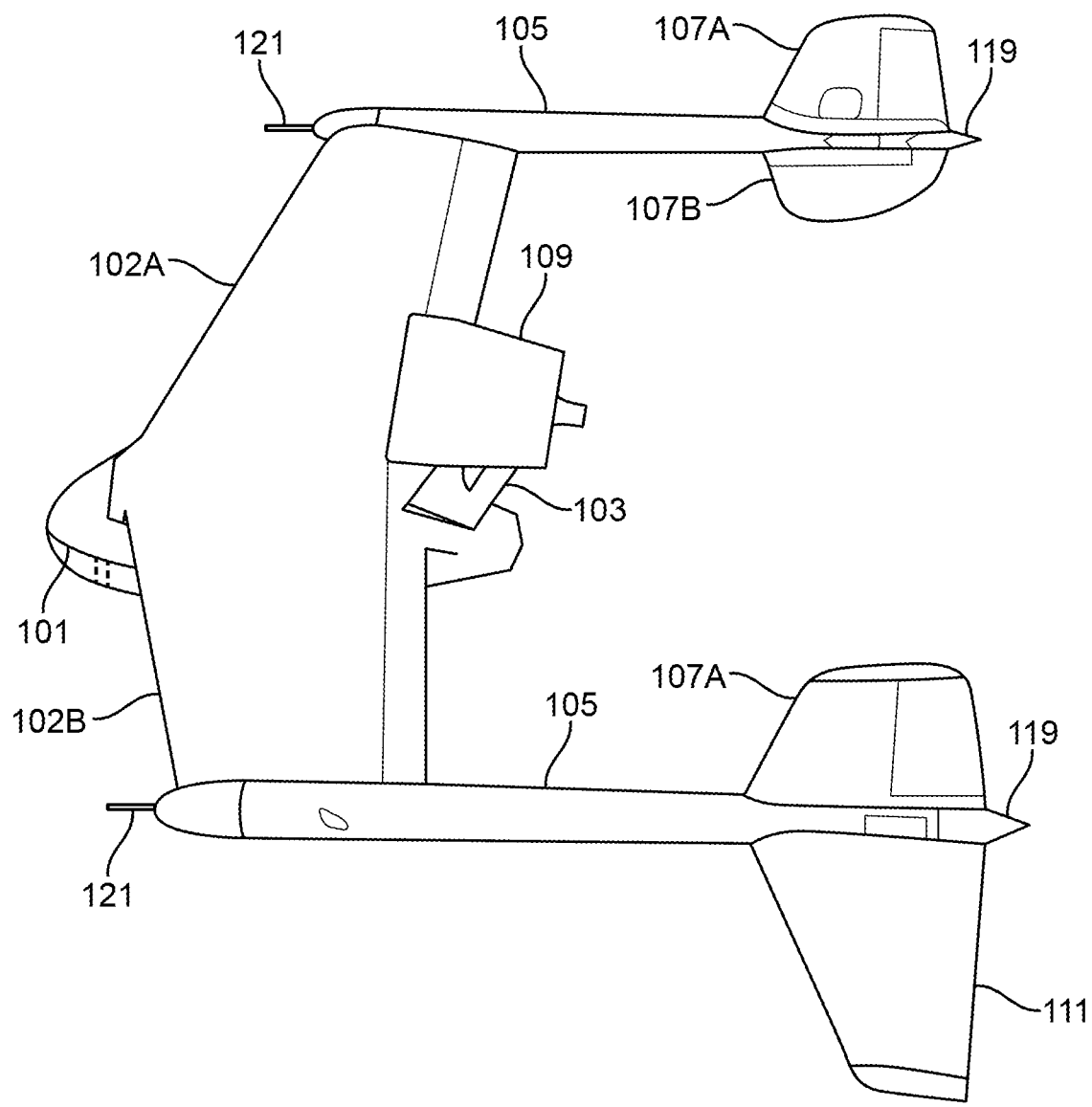
FIG. 1C illustrates a top-left perspective view of the drone, according to an embodiment.
Figure 1D:
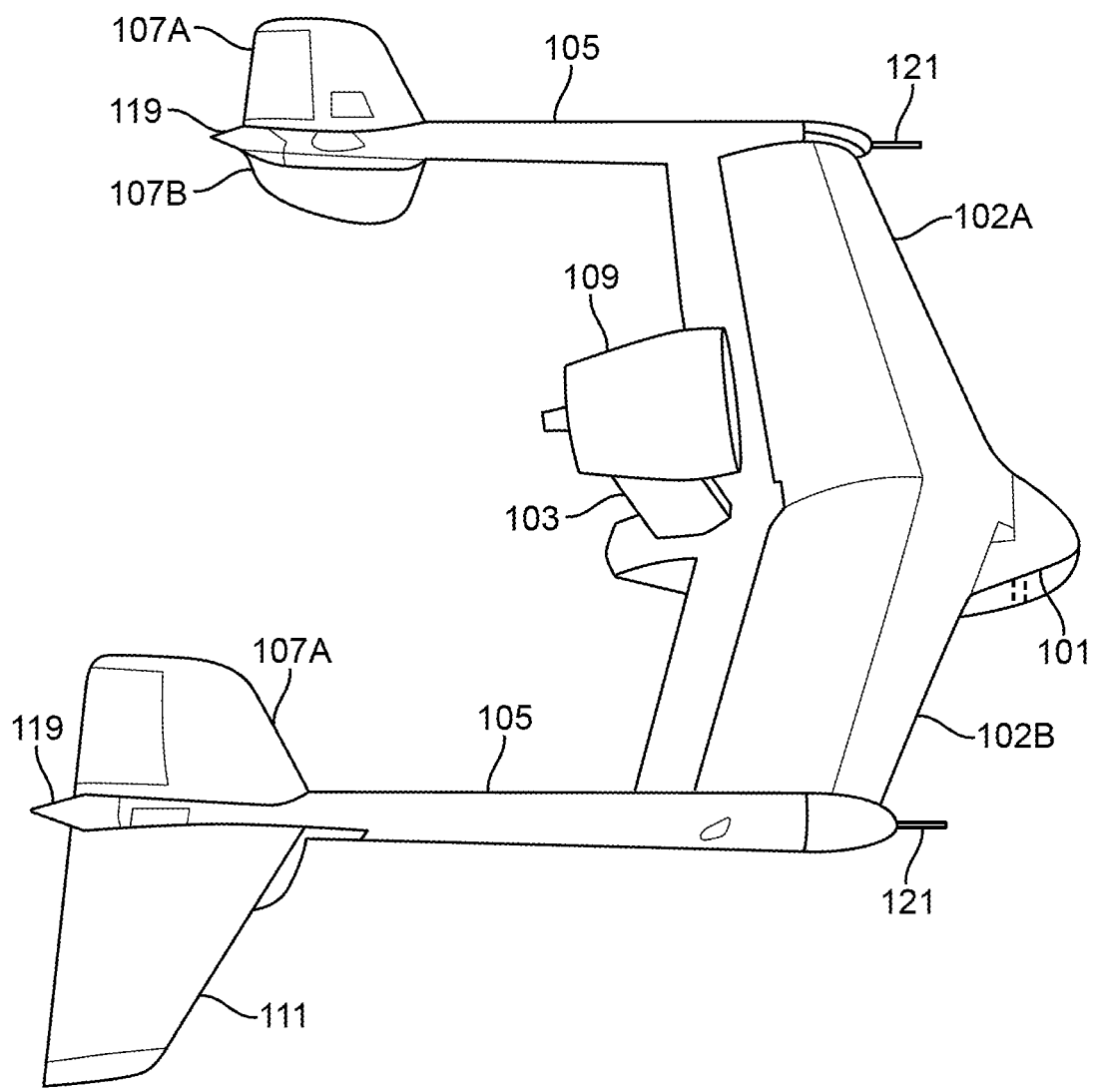
FIG. 1D illustrates a top-right perspective view of the drone, according to an embodiment.
Figure 1E:
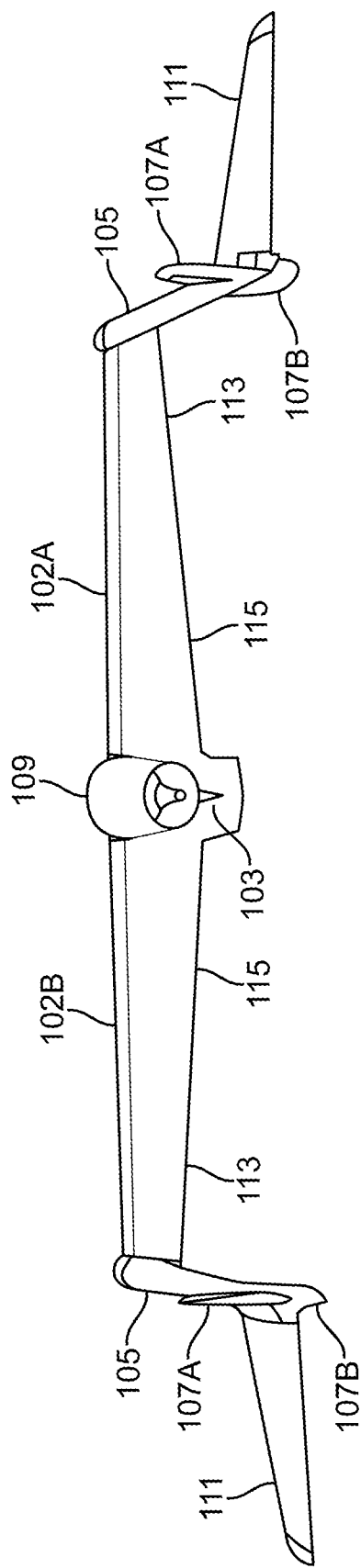
FIG. 1E illustrates a top-rear perspective view of the drone, according to an embodiment.

FIGS. 1A, 1B, 1C, 1D, and 1E illustrate different perspective views of a drone 100 according to one embodiment. Specifically, FIG. 1A illustrates a top-front-left perspective view of the drone 100, FIG. 1B illustrates a top-front perspective view of the drone 100, FIG. 1C illustrates a top-left perspective view of the drone 100, FIG. 1D illustrates a top-right perspective view of the drone 100, and FIG.

1E illustrates a top-rear perspective view of the drone 100 according to an embodiment. In one embodiment, the drone 100 is a low altitude, Class II small, unmanned aircraft system (sUAS) configured for low altitude, ultra-quiet command, control, communications, computers, intelligence, surveillance and reconnaissance (C4ISR) missions. However, the drone 100 may be used for other applications.

In one embodiment, the drone 100 (e.g., an aircraft) comprises a fuselage 101, a main inboard wing 102, a pylon 103, a propulsor 109, a plurality of booms 105, a plurality of horizontal tails 111 (e.g., wings), and a plurality of vertical tails 107 (e.g., wings). The horizontal tails 111 and vertical tails 107 collectively form empennages of the drone 100. Note that in other embodiments, the drone 100 may include other components than shown in FIGS. 1A to 1E.

Figure 2:
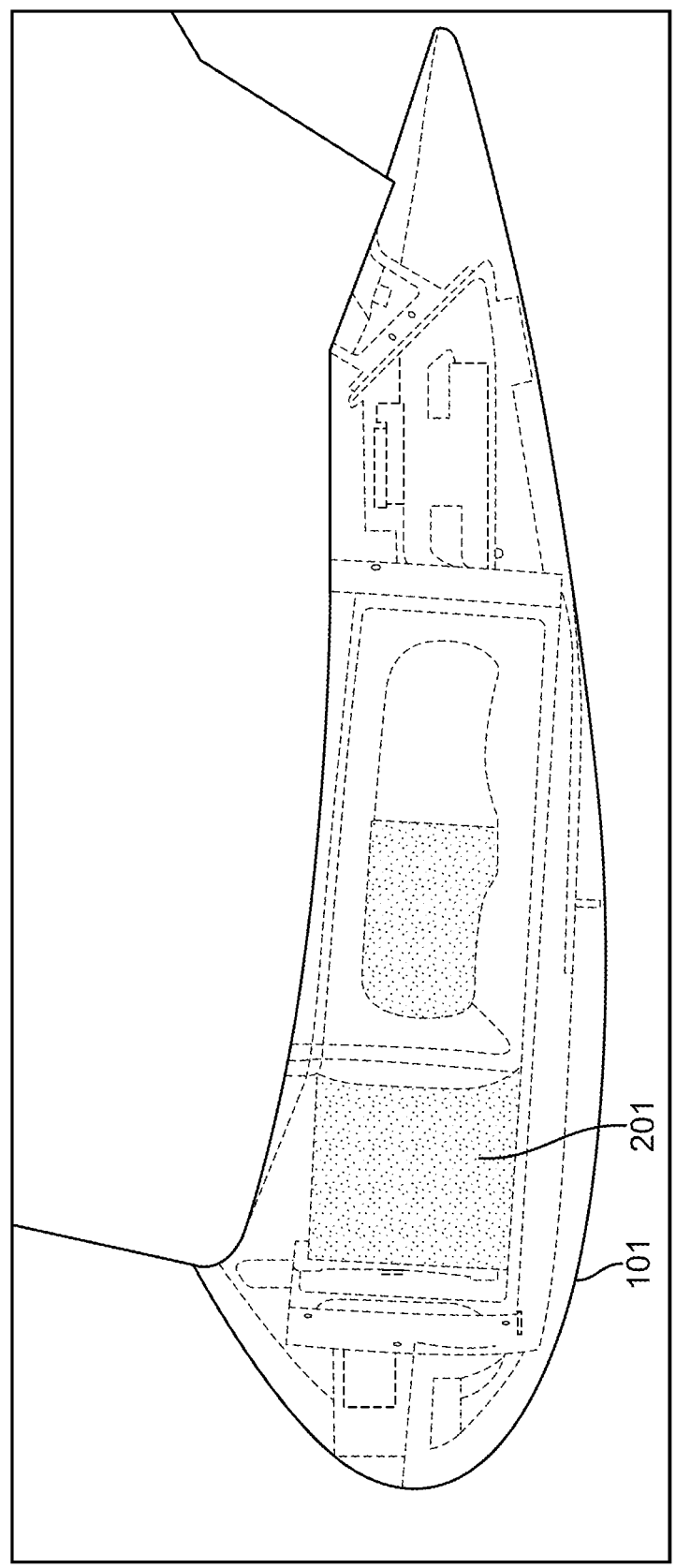
FIG. 2 illustrates an interior view of a fuselage of the drone, according to an embodiment.

The fuselage 101 is a main body of the drone 100. The fuselage 101 is a hollow structure. The fuselage 101 may be one continuous structure or may be a modular structure comprising multiple components that collectively form the fuselage 101. In one embodiment, the fuselage 101 contains one or more payloads. For example, the fuselage 101 contains a power supply 201 as shown in FIG. 2 that illustrates an interview view of the fuselage 101. The power supply 201 includes one or more electrical batteries (e.g., 22,000 mAh Li—Po battery or advanced lithium air batteries) for powering the drone 100. In one embodiment, the drone 100 is all-electric. However, the drone 100 may utilize a hybrid electric system to enable longer endurance, more payload, and/or longer range in other embodiments.

Figure 3B:
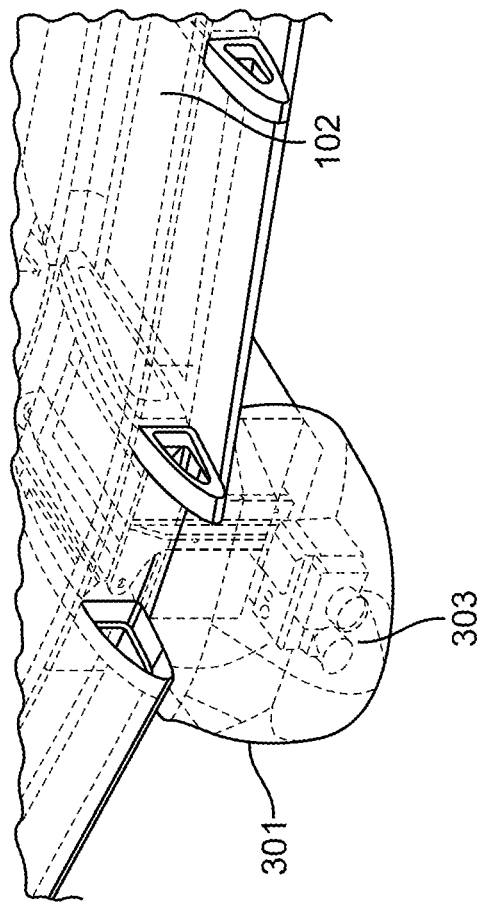
FIGS. 3A and 3B illustrate different views of payloads in the fuselage of the drone, according to an embodiment.
Figure 3A:
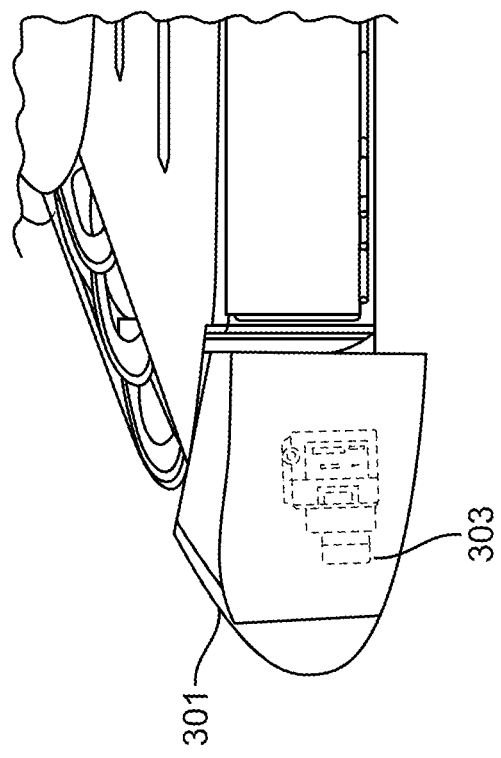

In one embodiment, the fuselage 101 includes an internal space 301 at the nose of the fuselage 101 that contains one or more payloads. The internal space 301 may be located at the front (e.g., the nose) of the fuselage 101 as shown in FIGS. 3A and 3B for example. However, the internal space 301 may be located at other portions of the fuselage 101.

One example of a payload located in the internal space 301 is a camera 303. The camera 303 may be forward facing as shown in FIGS. 3A and 3B to capture content such as images and/or video while the drone 100 is in flight. A portion of the front of the fuselage 101 that defines the internal space 301 may be made of clear material such as plastic or glass to allow for the camera 303 to capture the content. Other examples of payloads that may be housed within the fuselage 101 include one or more sensors, such as radar, lidar, audio sensors, vibration sensors, other intelligence, surveillance, reconnaissance (ISR) equipment, directional microphones, or some combination thereof.

In one embodiment, the fuselage 101 may further comprise electrical components for control of the drone 100. Examples of electrical components for controlling the drone 101 include one or more controllers such as one or more processors and memory device(s) which are used to control the propulsor 109 and actuating one or more control surfaces of the drone 100 (e.g., control of ailerons, rudder, elevator, tabs, flaps, spoilers, slats, etc.).

In one embodiment, one of more landing mechanisms may be attached to a bottom surface of the fuselage 101. The landing mechanisms may be a landing gear (e.g., a tricycle gear) or a landing skid.

Referring back to FIGS. 1A to 1E, the main inboard wing 102 is attached to an upper surface of the fuselage 101 that is opposite the bottom surface of the fuselage 101. The main inboard wing 102 is the central element connecting together the fuselage 101, booms 105, pylon, 103, and propulsor 109. The main inboard wing 102 is located between a first end (e.g., a front) and a second end (e.g., a back) of the fuselage 101. The main inboard wing 102 is configured to provide lift for the drone 100 for flight and has a dihedral with respect to the fuselage 101 to provide for stability and improved sensor viewing angles as further described below in one embodiment. The main inboard wing 102 may be made of a composite material such as carbon fiber, metal (e.g., aluminum or titanium), or an alloy.

In one embodiment, the main inboard wing 102 includes a first side 102A disposed at a first side of the fuselage 101 (e.g., the right side) and a second side 102B that are disposed at a second side of the fuselage 101 (e.g., the left side). The first side 102A and the second side 102B of the main inboard wing 102 may be configured as a continuous structure that is connected to the upper surface of the fuselage 101 in one embodiment. Alternatively, the first side 102A and the second side 102B of the main inboard wing 102 may be separate structures, each coupled to the upper surface of the fuselage 2101

Figure 4:
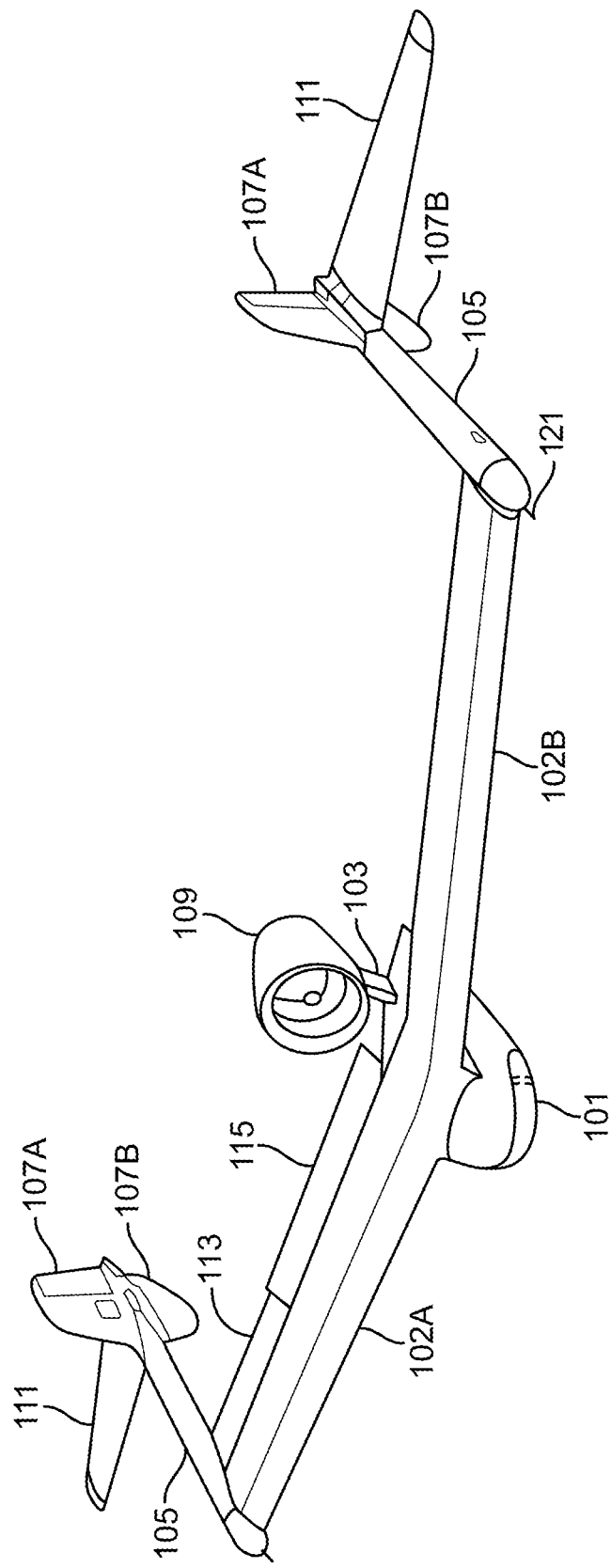
FIG. 4 illustrates ailerons and flaperons of the drone, according to an embodiment.

As shown in FIGS. 1A to 1E, an upper surface (e.g., top) of the main inboard wing 102 is curved. The upper surface of the main inboard wing 102 slopes downward from the leading edge of the main inboard wing 102 to the trailing edge of the main inboard wing 102. Referring to FIG. 4, the main inboard wing 102 includes a plurality of control surfaces at the trailing edge of the main inboard wing 102 that control the drone 100 during flight. In one embodiment, the control surfaces include a plurality of ailerons 113 and a plurality of flaperons 115.

In one embodiment, the first side 102A and the second side 102B of the main inboard wing 102 each include one or more ailerons 113 located towards the tip of the trailing edge of the main inboard wing 102. Furthermore, the trailing edge of the first side 102A and the second side 102B of the main inboard wing 102 each include one more flaperons 115. The flaperon 115 on each side of the main inboard wing 102 is located between the respective aileron 113 and the fuselage 101 as shown in FIG. 4.

One end of each aileron 113 and flaperon 115 is configured to be attached to the trailing edge of the main inboard wing 102. Each aileron 113 and flaperon 115 is configured to pivot about the attachment point to the trailing edge of the main inboard wing 102 to control movement of the drone 100 during flight as shown in FIG. 4. For example, the ailerons 113 are used to control the roll of the drone 100 (e.g., movement around the drone's longitudinal axis) which results in a change in flight path due to the tilting of the lift vector known as "rolling" or "banking." The flaperons 115 control the lift and drag of the drone 100 by pivoting and/or extending inward or outward from the trailing edge of the main inboard wing 102.

Figure 5A:
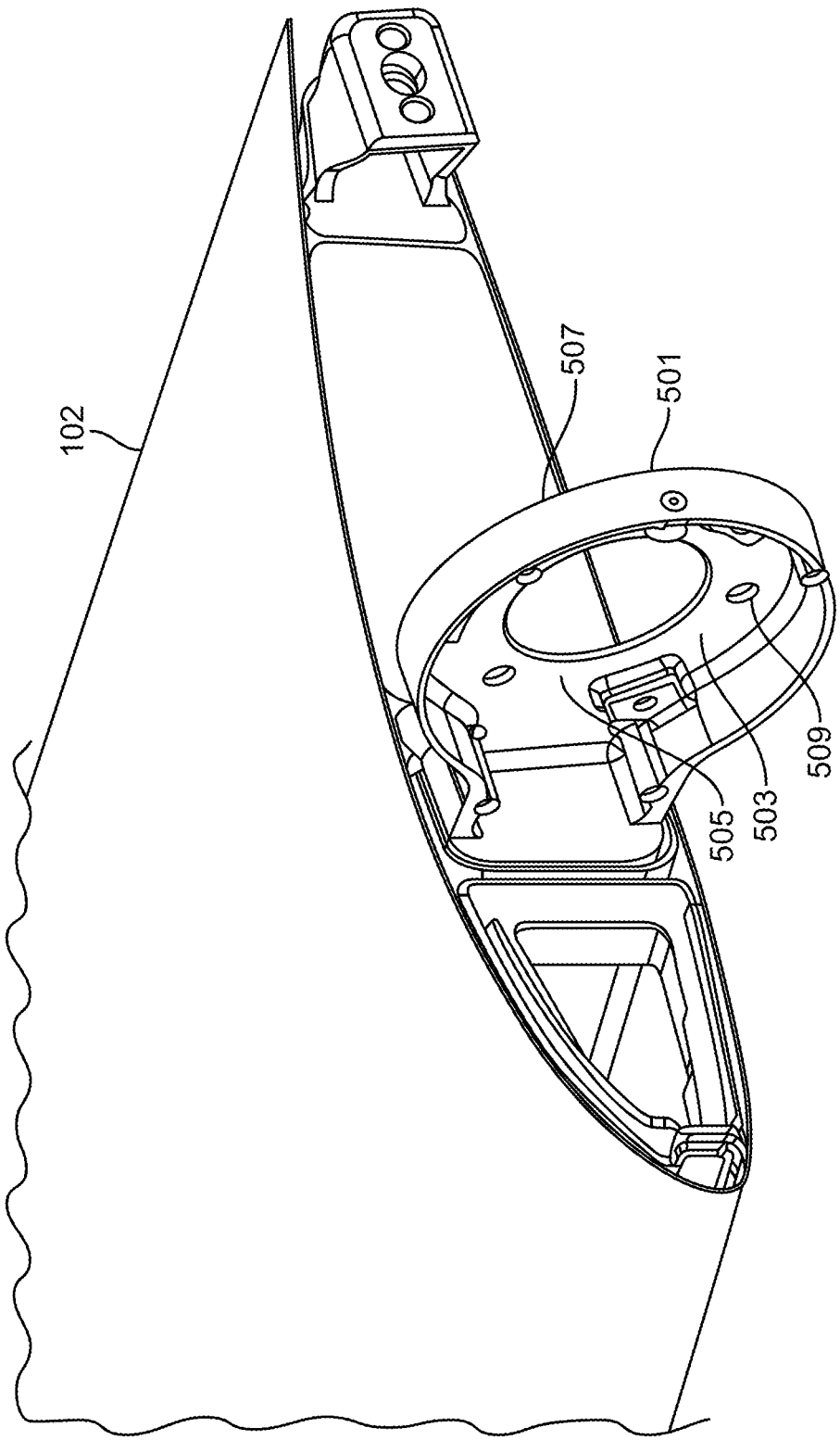
FIG. 5A illustrates a boom connection structure at an end of the main inboard wing of the drone, according to an embodiment.

In one embodiment, the tips of the main inboard wing 102 each include a boom connection structure 501 as shown in FIG. 5A. The boom connection structure 501 is configured to attach a respective boom 105 to each tip of the main inboard wing 102. The boom connection structure 501 is a plate like structure that includes a connection surface 503 to connect the boom to the main inboard wing 102. The connection surface 503 may have a first side 505 and a second side 507 that is opposite the first side 505. In one embodiment, the first side 505 of the connection surface 503 is configured to connect to a first part of the boom 105 and the second side 507 of the connection surface 503 is configured to connect to a second part of the boom 105 as will be further described below. The boom connection structure 501 may also include a plurality of holes 509 through which fasteners (e.g., bolts) pass through to connect the boom 105 to the boom connection structure 501. As shown in FIG. 5A, the boom connection structure 501 is circular in shape, but can be configured in any other shape.

Figure 5B:
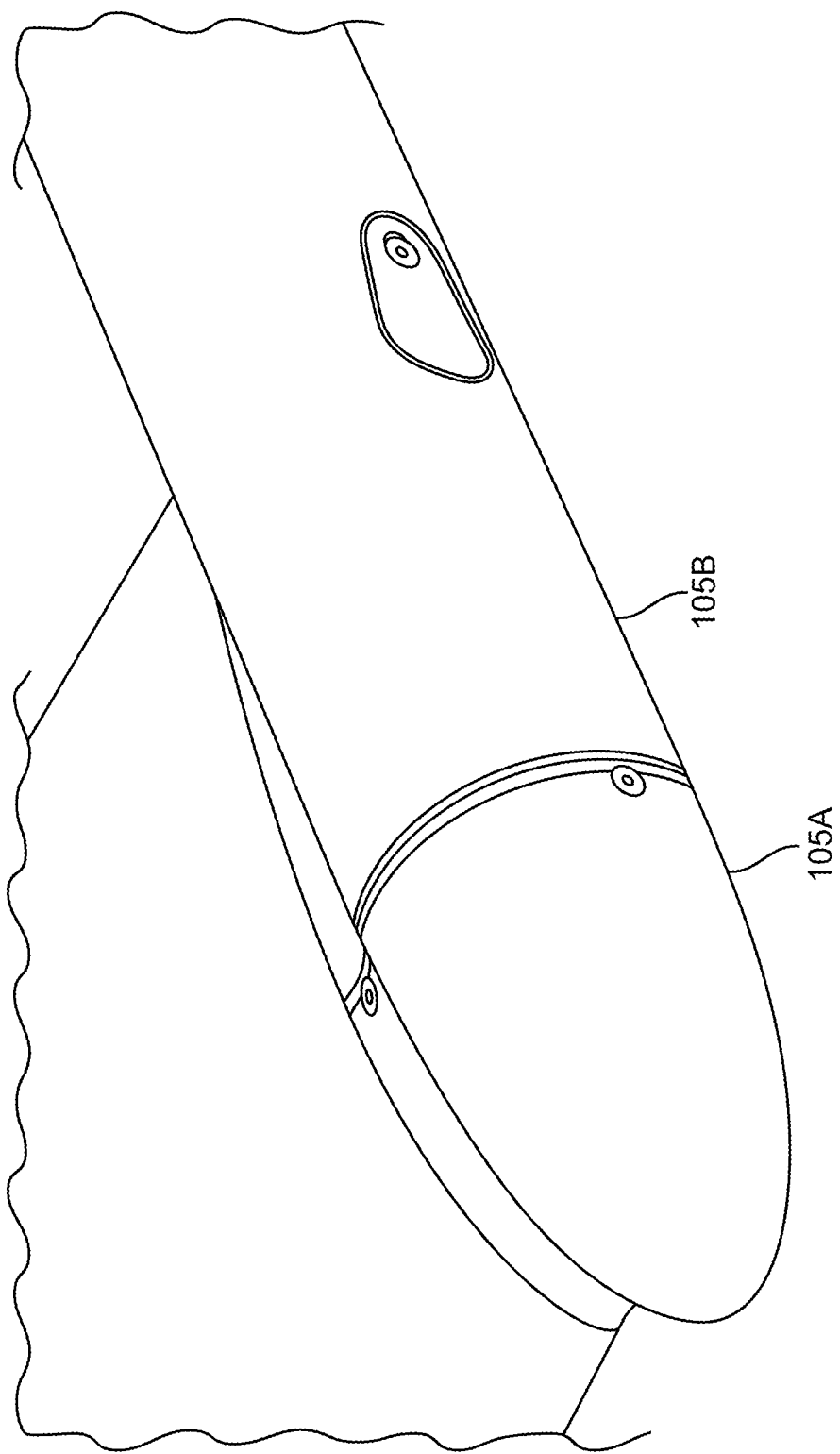
FIG. 5B illustrates a boom connected to the end of the main inboard wing via the boom connection structure, according to an embodiment.

FIG. 5B illustrates a boom 105 connected to the boom connection structure 501 according to one embodiment. In one embodiment, the first part of the boom 105 is a nose cone 105A of the boom 105 and the second part of the boom 105 is a main body 105B of the boom 105. As shown in FIG. 5B, the nose cone 105A of the boom 105 is connected to the first side 505 of the connection surface 503 of the boom connection structure 501 whereas the main body 105B of the boom 105 is connected to the second side 507 of the connection surface 503 of the boom connection structure 501. As a result, a portion of the nose cone 104A and a portion of the main body 105B of the boom 105 are attached to the main inboard wing 102.

In one embodiment, a width of the main body 105B of the boom 105 is substantially constant across from a first end of the main body 105B of the boom 105 that is connected to the nose cone 105A to a second end of the main body 105B of the boom. In one embodiment, a tail cone 119 is connected to the second end of the main body 105B of the boom 105 as shown in FIG. 1C.

In one embodiment, the nose cone 105A of each boom 105 is configured to house additional payload. The payload may be a sensor such as a pitot tube 121 in one example shown in FIG. 1C. The pitot tubes 121 are used measure stagnation pressure and static pressure to obtain the dynamic pressure of the drone 100. The dynamic pressure can be used to calculate airspeed of the drone 100. However, other types of sensors may be contained within the nose cone 105A of each boom 105 in other embodiments. For example, the nose cone 105A may house at least one of a camera, radar, lidar, audio sensors, vibration sensors, intelligence, surveillance, reconnaissance (ISR) equipment, directional microphones, or a combination thereof.

Figure 6:
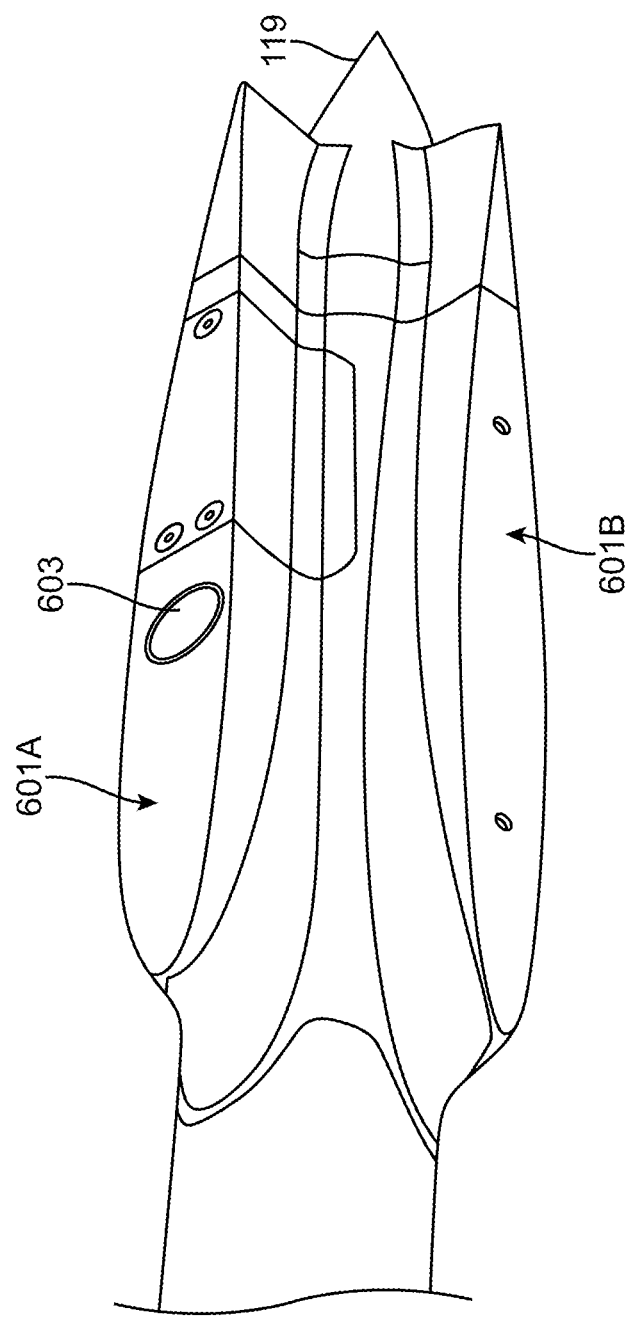
FIG. 6 illustrates tail connection surfaces at an end of the boom of the drone, according to an embodiment.

In one embodiment, the main body 105B of each boom 105 extends rearward with respect to the front of the fuselage 101 such that an end of each boom is located past the end of the fuselage 101. The main bodies 105B of the booms 105 include connection points for connecting the plurality of horizontal tails 111 and the plurality of vertical tails 107 to the main bodies 105B of the booms 105. FIG. 6 illustrates the tail connection surfaces located at the end of each boom 105 that is located past the fuselage 101 according to one embodiment.

In one embodiment, the end of the main body 105B of each boom 105 includes a first connection surface 601A configured to contact a connection surface of a respective horizontal tail 111. The first connection surface 601A further includes an axle hole 603 though a thickness of the boom 105. An axle of the horizontal tail 111 is inserted though the axle hole 603 to connect the horizontal tail 111 to a horizontal tail rotation mechanism as will further be described below. In one embodiment, the main body 105B of each boom 105 further includes one or more second connection surfaces 601B. Each second connection surface is configured to contact a connection surface of a respective vertical tail 107. For example, the main body 105B of each boom 105 may include a second connection surface 601B at an upper surface of the boom 105 to connect an upper vertical tail 107A to the boom 105 and a second connection surface 601B at a lower surface of the boom 105 to connect a lower vertical tail 107B to the boom 105.

In one embodiment, a plurality of vertical tails 107 are connected to each boom 105 as shown in FIGS. 1A to 1E, 4, and 7. The plurality of vertical tails 107 connected to each boom 105 includes the upper vertical tail 107A and the lower vertical tail 107B. The upper vertical tail 107A extends in an upward direction towards the sky from the upper surface of the boom 105 so that the upper vertical tail 107A is above the boom 105. In contrast, the lower vertical tail 107B extends in a downward direction from a lower surface of the boom 105 towards the ground so that the lower vertical tail 107B is below the boom 105.

In one embodiment, one or more of the plurality of vertical tails 107 include a movable control surface 117 such as a rudder. The movable control surface 117 of a vertical tail 107 includes a first end that is connected to a portion of the vertical tail 107 and a second end that is not connected to the vertical tail 107. The movable control surfaces 117 of the vertical tails 107 pivot about the end that is connected to the portion of the vertical tail 107 keep the plane in line with the direction of motion of the drone 100. To change the direction of motion (e.g., yaw control) of the drone 100, the movable control surface 117 may move (e.g., pivot) as shown in FIG. 7.

Figure 7:
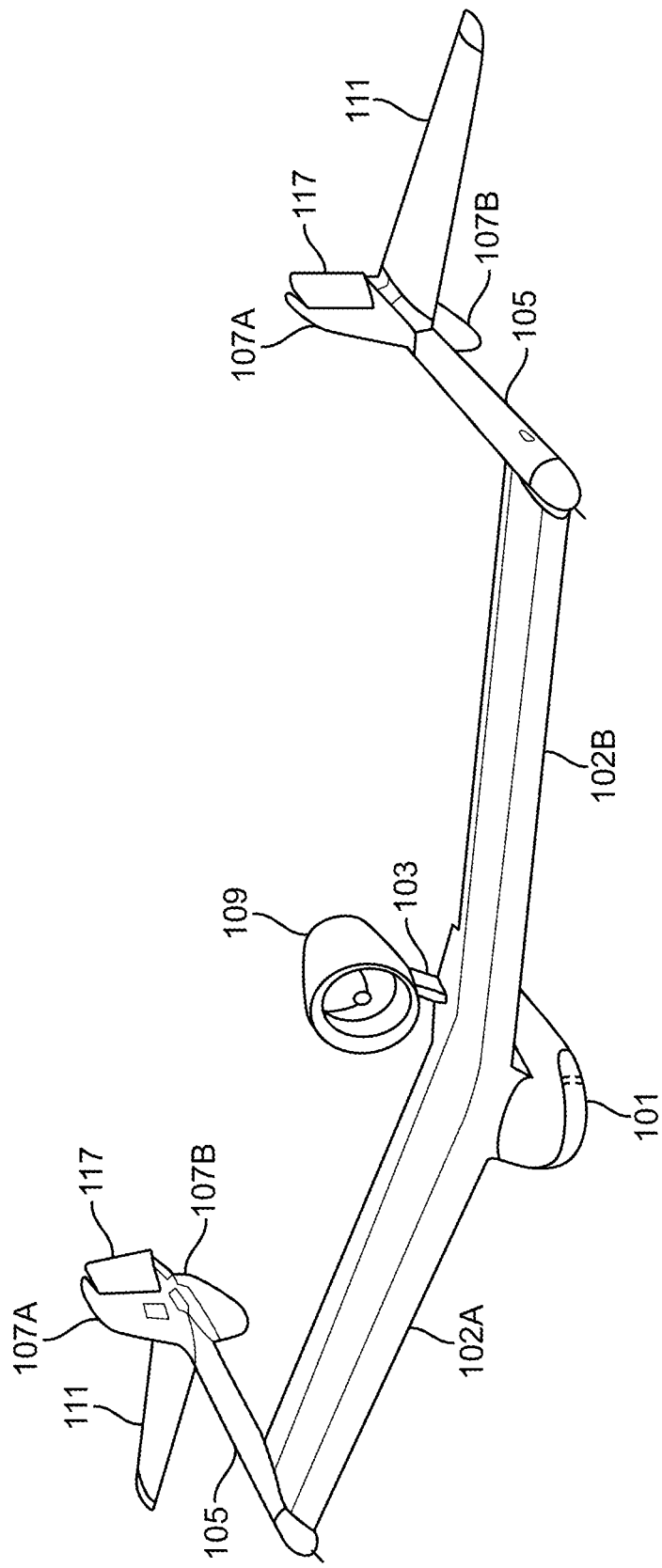
FIG. 7 illustrates movable control surfaces of the vertical tails of the drone, according to an embodiment.

In the example shown in FIG. 7, the upper vertical tails 107A include movable control surfaces 117, but the lower vertical tails 107B lack movable control surfaces 117. The movable control surfaces 117 of the upper vertical tails 107A move in unison or can be independently controlled. In other embodiments, both the upper vertical tails 107A and the lower vertical tails 107 each include a respective movable control surface 117.

Figure 8:
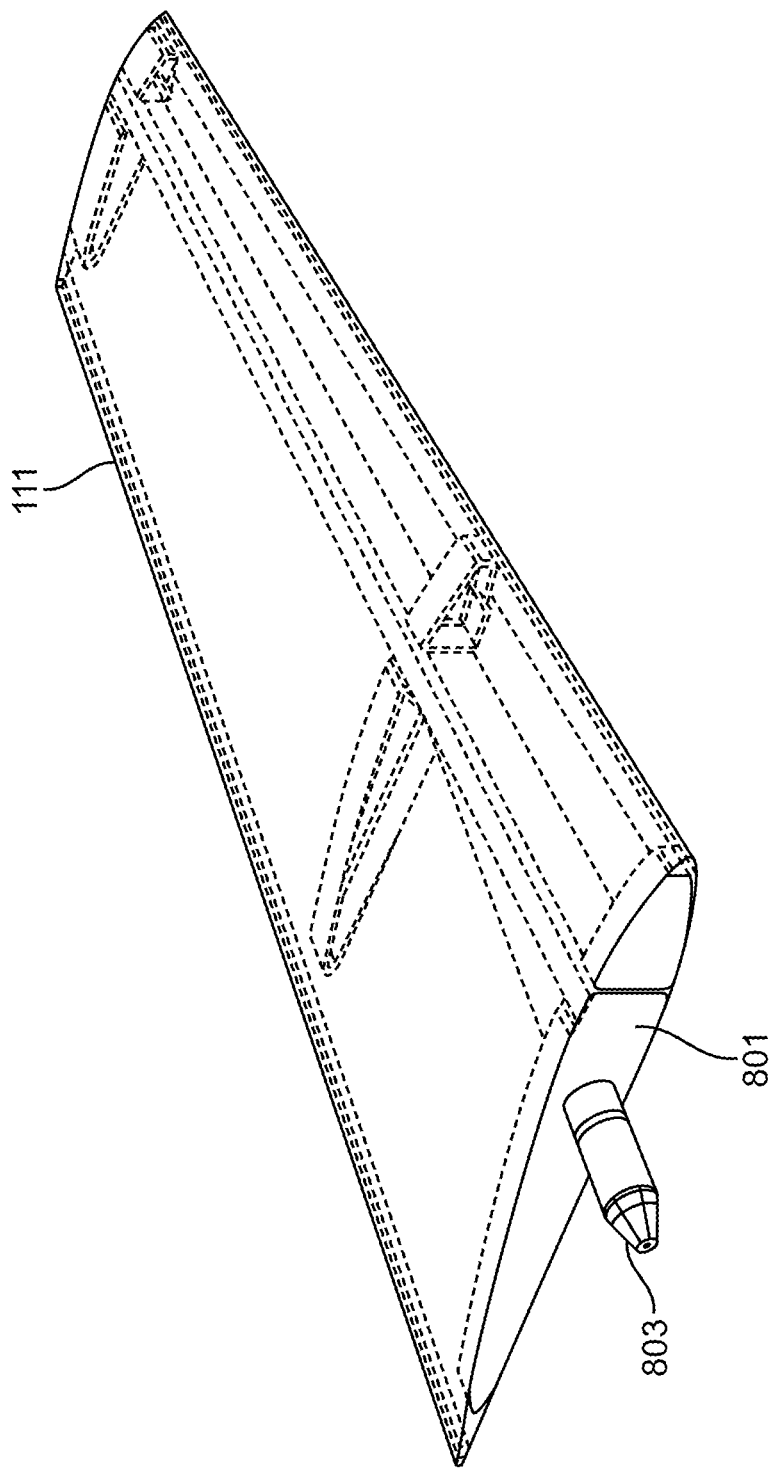
FIG. 8 illustrates a perspective view of a horizontal tail of the drone, according to an embodiment.

Referring to FIG. 8, a horizontal tail 111 is shown according to one embodiment. The horizontal tail 111 includes a connection surface 801. The connection surface 801 is configured to contact the first connection surface 601A of the boom 105 shown in FIG. 6. The horizontal tail 111 further includes an axle 803 that protrudes from the connection surface 801. The axle 803 is configured to be inserted into the axle hole 603 of the boom 105 to connect the horizontal tail 111 to the boom 105. While the horizontal tails 111 are connected to the boom 105, the horizontal tails 111 have an anhedral with respect to the booms 105 (e.g., 5° anhedral). Different angles of the horizontal tails 111 can be employed depending on different loading conditions and mission needs. For example, the horizontal tails 111 may have a dihedral with respect to the booms 105.

Figure 9:
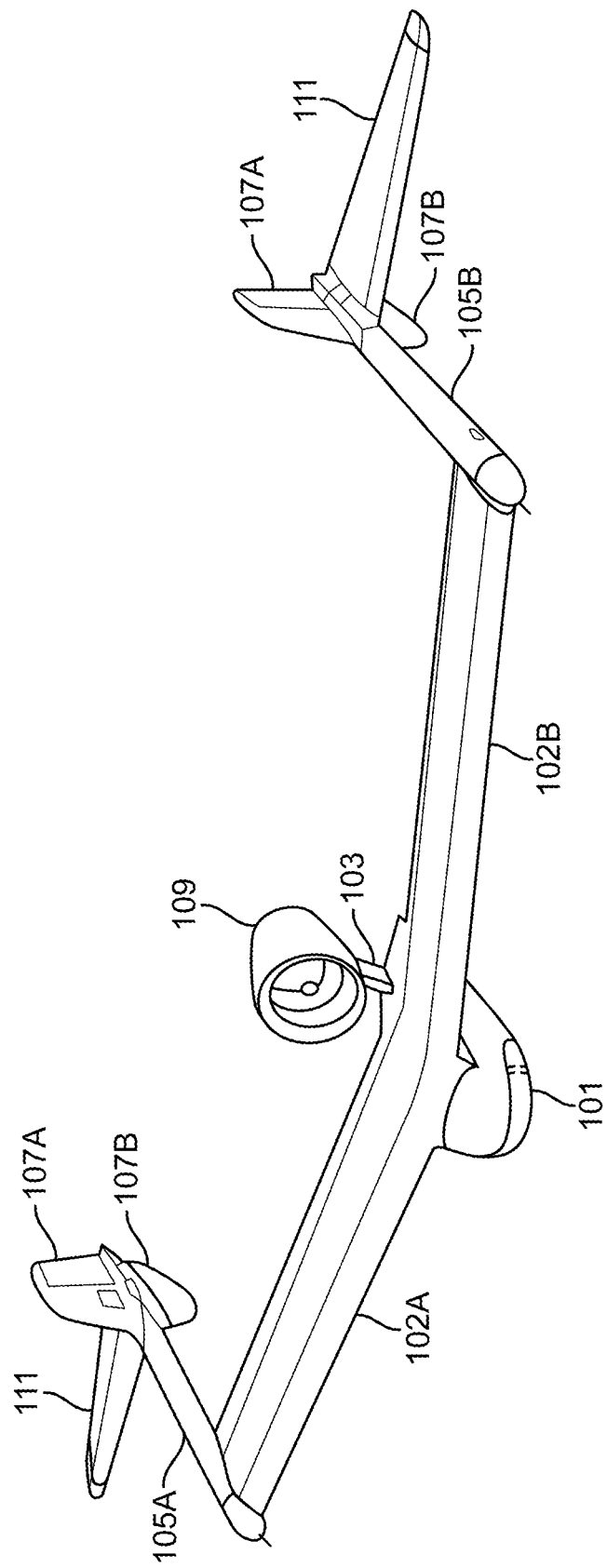
FIG. 9 illustrates movable horizontal tails of the drone, according to an embodiment.
Figure 13B:
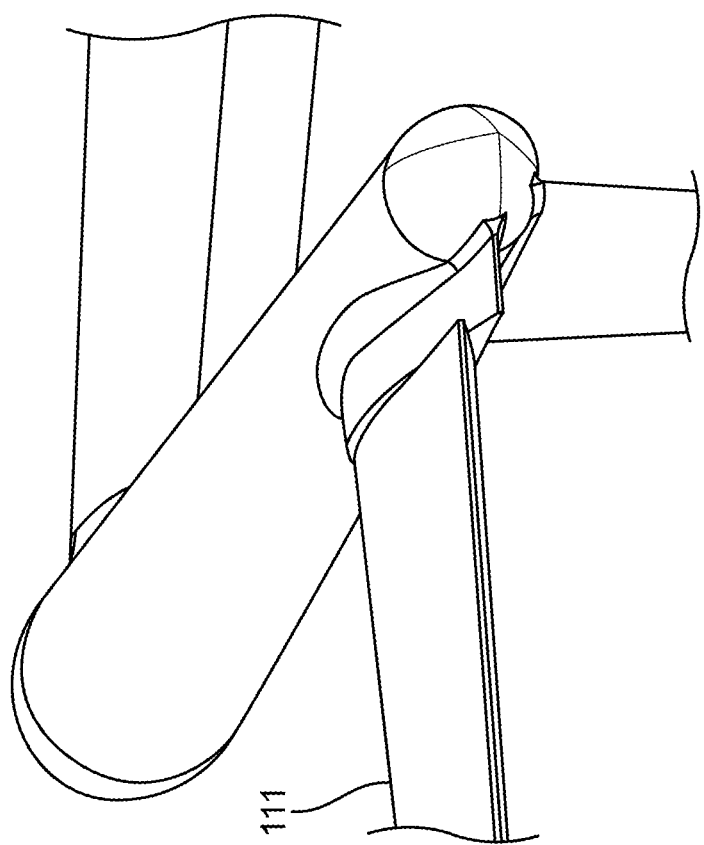
FIGS. 13A and 13B are detailed views of the horizontal tail in different rotated positions, according to an embodiment.
Figure 13A:
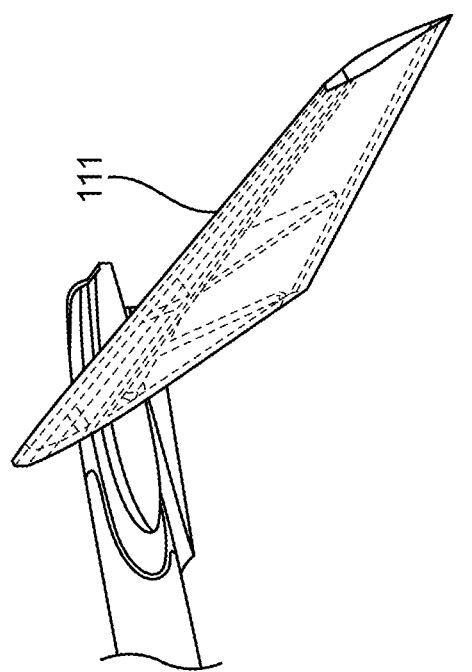

Referring to FIG. 9, in one embodiment the horizontal tails 111 are movable. The horizontal tails 111 are configured to rotate about the axle 803 as shown in FIG. 9. As shown in FIGS. 9, 13A, and 13B, the entire horizontal tail 111 is configured to rotate rather than just a trailing edge of the horizontal tail 111. By rotating the horizontal tails 111, the pitch of the drone 100 can be changed and the drone 100 can be stabilized about the longitudinal axis of the drone 100. In on embodiment, the horizontal tails 111 are configured to rotate in unison. However, in other embodiments the horizontal tails 111 may move independent from each other.

Referring back to FIGS. 1A to 1E, the pylon 103 is configured to support the propulsor 109. A first end of the pylon 103 is connected to the upper surface of the fuselage 101. The second end of the pylon 103 extends upward away from the fuselage 101 in a direction towards the sky. The propulsor 109 is attached to the second end of the pylon 103.

In one embodiment, the pylon 103 is placed at the aft end of the fuselage 101. Specifically, the pylon 103 is placed such that the propulsor 109 is located at the center of lift of the drone 100. As such, the weight of the propulsor 109 may provide stability for the drone 100 when in flight, as the propulsor 109 is located to reduce moments generated on the airframe of drone 100 and to place the center of thrust as close as possible to a neutral axis of the airframe of the drone 100.

For subsonic applications, most of the noise from the propulsor 109 emanates from the front (e.g., inlet) of the propulsor 109 as opposed to the exhaust (e.g., outlet) of the propulsor 109. By sweeping the pylon 103 aft and positioning the propulsor 109 above the main inboard wing 102, the main inboard wing 102 is used for shielding of any forward-emanating fan noise components. The propulsor 109 is also located to reduce any moment generated on the airframe and to place the center of thrust as close as possible to the neutral axis of the drone 100. This helps with reducing the size of tail surface area required which aids in reducing weight overall.

In one embodiment, a height of the pylon 103 is based on a diameter of the propulsor 109. Specifically, a height of the pylon 103 above a boundary layer of the main inboard wing 102 may be at least 30% of overall diameter of the propulsor 109 for purposes of optimal fan efficiency and minimal inlet distortion of the propulsor 109. The height of the pylon being at least 30% of the overall diameter of the propulsor 109 is critical for optimal fan efficiency.

The boundary layer of the main inboard wing 102 is a thin layer of air in the immediate vicinity of a bounding surface formed by air flowing along the main inboard wing 102. By placing the propulsor 109 at a height that is at least 30% of the diameter of the propulsor above the boundary layer of the main inboard wing 102, inlet distortion of air into the propulsor 109 is reduced significantly (e.g., less than 0.1% distortion). Thus, air flow into an inlet of the propulsor 109 is substantially uniform, thereby reducing losses in a propulsor efficiency and any distortions.

Furthermore, noise emanating from the propulsor 109 may primarily point outwards in the direction of a fan face of the propulsor 109. By placing the propulsor 109 near the aft of the fuselage 101 and behind the trailing edge of the main inboard wing 102, a back portion of the main inboard wing 102 provides acoustic shielding for the sensors located in the nose of the fuselage 101 from the noise emanating from the propulsor 109.

As mentioned above, the propulsor 109 is connected to the second end of the pylon 103 and is situated above the fuselage 100. The propulsor 109 is configured to generate thrust to propel the drone 100 in a forward direction. A rotor of the propulsor 109 produces thrust as it rotates with speed and as airflow is being provided. The thrust may be dependent on a ratio of the speed of the tip of rotating blades of the rotor and free stream air velocity at the fan inlet (tip-speed ratio). In one embodiment, the propulsor 109 is a ducted propulsor as described in U.S. Provisional Patent Application No. 63/356,885 filed on Jun. 29, 2023, which is incorporated by reference in its entirety. A ducted propulsor allows for additional shielding of loading noise across more azimuths and also allows for higher thrust located closer to the airframe body of the drone 100. Furthermore, since the height of the pylon 103 above the main inboard wing 102 is at least 30% of overall fan diameter of the propulsor 109, a bottom portion of the fan face of the propulsor 109 that is just above the boundary layer of the main inboard wing 102 may be substantially freestream or as close to freestream as possible, resulting in a substantially uniform flow to the inlet of the propulsor 109 (i.e., uniform circle rather than air flow differing between bottom portion and top portion of the fan face).

In one embodiment, the placement of the horizontal tails 111 and booms 105 allows for reduced wetted area for drag and mass reduction. By placing the horizontal tails 111 outboard, the horizontal tails 111 are not in the downwash of the propulsor 109 that complicates control at low-speed and takeoff, necessitating larger variations to trim. Thus, the length of the booms 105 are determined according to air flow modeling that indicate the location of the downwash of the propulsor 109. Furthermore, the length of the booms 105 are also determined according to the air flow modeling such that the horizontal tails 111 are positioned in an upwash field of the vortex roll-up off of the main inboard wing 102 around the boom. The effectiveness of the horizontal tails 111 is thus increased as the vortex roll-up provides additional lift. As a result, at cruise conditions, the horizontal tails have a net lift vector pointed towards the forward flight direction, with a positive thrust component thereby reducing battery consumption.

Furthermore, vortex roll up off the boom 105 also aids in the effectiveness of the vertical tails 107. Further aerodynamic optimization of the vortex roll-up allows the vertical tails 107 to be undersized (tail volume coefficients) relative to more conventional aircraft designs while maintaining similar or better performance.

Horizontal Tail Rotation

Figure 10:
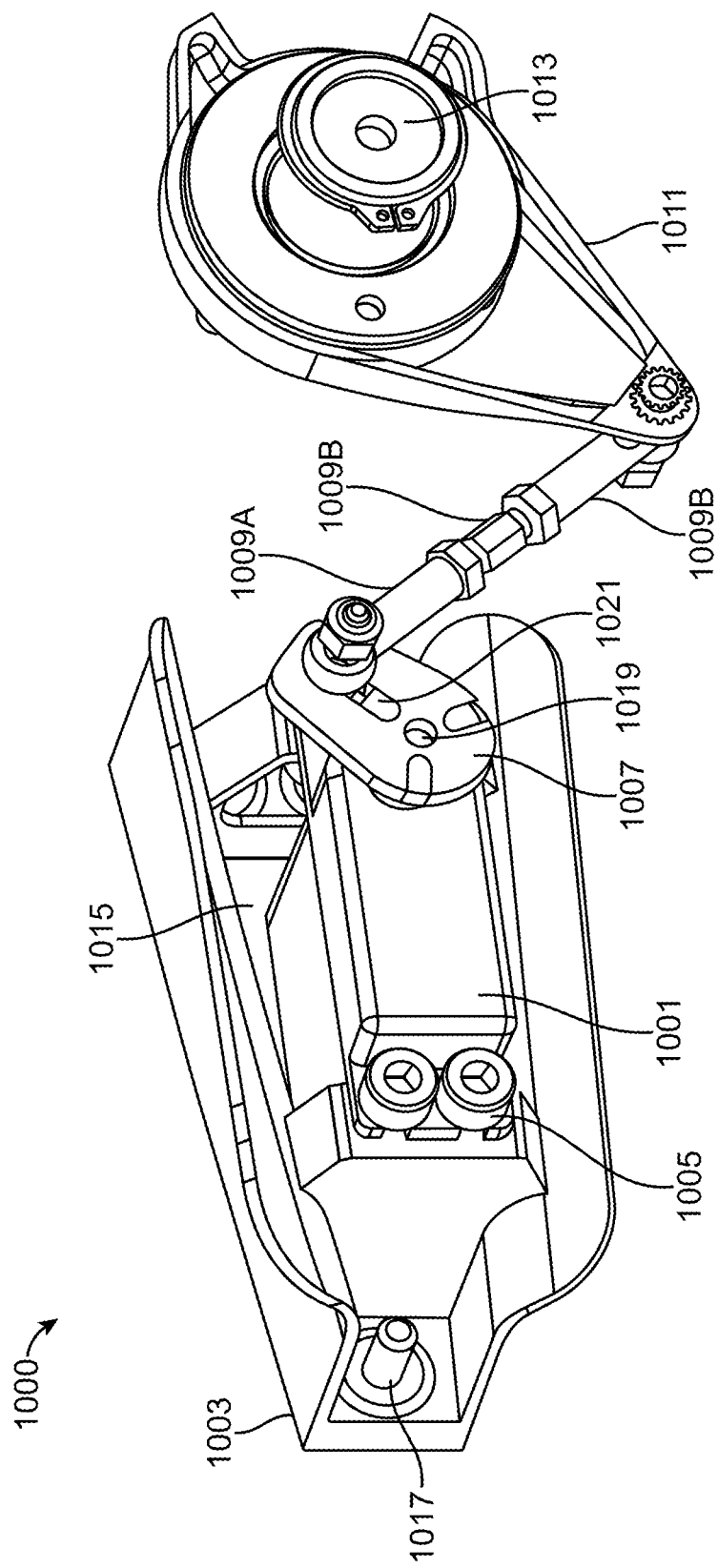
FIG. 10 illustrates a horizontal tail rotation mechanism of the drone, according to an embodiment.

As mentioned above, the horizontal tails 111 are rotatable (e.g., movable). FIG. 10 illustrates a horizontal tail rotation mechanism 1000 of the drone 100 that is configured to rotate a corresponding horizontal tail 111, according to an embodiment. Each horizontal tail 111 is connected to a corresponding horizontal tail rotation mechanism 1000. In the embodiments described herein, the drone 100 includes two horizontal tails 111. Thus, the drone 100 may include two horizontal tail rotation mechanisms 1000 that are each located within a respective boom 105 of the drone 100. In one embodiment, each horizontal tail rotation mechanism 1000 comprises a servomechanism ("servo") 1001, a servo mount 1003, a servo arm 1007, a linkage 1009, a spline drive arm 1011, and a spline drive 1013. In other embodiments, the horizontal tail rotation mechanism 1000 may have other components than shown herein.

The servo 1001 is configured to control the angular position of the horizontal tail 111. An example of the servo 1001 is a servo motor coupled to a sensor for position feedback and a controller that controls the servo motor. The servo 1001 includes an output shaft that rotates to change the angular position of the horizontal tail 111. In one embodiment, the output shaft of the servo 1001 is splined. That is, the output shaft of the servo 1001 includes ridges, teeth, or protrusions (e.g., male splines).

The servo mount 1003 is configured to house the servo 1001 in one embodiment. The servo mount 1003 includes a cavity 1015. The servo 1001 is inserted (e.g., placed) into the cavity 1015. The servo 1001 is connected to the servo mount 1003 using one or more fasteners 1005 located at each end of the servo 1001. In one embodiment, the servo mount 1003 is connected to an inner surface of a corresponding boom 105. The servo mount 1003 is connected to the inner surface of the boom 105 via a fastener 1017.

In one embodiment, the servo arm 1007 is an intermediate connection member positioned between the servo 1001 and the horizontal tail 111. The servo arm 1007 is configured to rotate based on the rotation of the output shaft of the servo 1001. The servo arm 1007 includes a hole 1019 through an entire thickness of the servo arm 1007. The output shaft of the servo 1001 is inserted into the hole 1019. In one embodiment, the hole 1019 of the servo arm 107 has grooves (e.g., a female spline) that matches the protrusions (e.g., male spline) of the output shaft to connect the output shaft of the servo 1001 to the servo arm 1007. As the output shaft of the servo 1001 rotates, the servo arm 1007 rotates in accordance with the rotation of the output shaft of the servo 1001.

In one embodiment, the servo arm 107 includes a slot 1021 through an entire thickness of the servo arm 1007. The slot 1021 is configured to control the amount of rotation of the horizontal tail 111 as will be further describe below. The slot 1021 includes a first end adjacent to the hole 1019 and a second end positioned adjacent to an end of the servo arm 107.

The linkage 1009 is another intermediate connection member between positioned between the servo 1001 and the horizontal tail 111. The linkage 1009 is configured to adjust the amount of rotation of the horizontal tail 111 based on the placement of the linkage 1009 within the slot 1021 of the servo arm 1007. The linkage 1009 includes a plurality of heim joints 1009A, 1009B and a length adjusting mechanism 1009B in one embodiment.

Each heim joint 1009A, 1009B of the linkage 1009 is located at opposite ends of the linkage 1009. The first heim joint 1009A is connected to the servo arm 1007 through the slot 1021 of the servo arm 1021 via a fastener (e.g., a nut and bolt) and the second heim joint 100B is connected to the spline drive arm 1011. The position of the linkage 1009 along the length of the slot 1021 impacts the amount of rotation of the horizontal tail 111. For example, connecting the linkage 1009 at the first end of the slot 1021 adjacent to the hole 1019 reduces the amount of rotation of the horizontal tail 111 as the effective radius of rotation of the servo arm 1021 is reduced whereas connecting the linkage 1009 at the second end of the slot 1021 adjacent to the end of the servo arm 1021 increases the amount of rotation of the horizontal tail 111 as the effective radius of rotation of the servo arm 1021 is increased. The linkage 1009 may be connected to the servo arm 1007 along any position along the slot 1021 between the first end and second end of the slot 1021 to adjust the rotation of the horizontal tail 111.

In one embodiment, the length adjusting mechanism 1009B is configured to adjust the length of the linkage 1007. By adjusting the length of the linkage 1009, the initial position of the horizontal tail 111 in the non-rotated state can be fine-tuned. The length adjusting mechanism 1009B includes a threaded rod and a plurality of jam nuts. The threaded rod is screwed into both heim joints 1009A and 100B and as the jam nuts are rotated, the threaded rod is either inserted more into the heim joints 1009A, 1009B to reduce the length of the linkage 1009 or extends out of the heim joints 1009A, 1009B to increase the length of the linkage 1009 depending on the amount of rotation of the jam nuts.

Figure 11C:
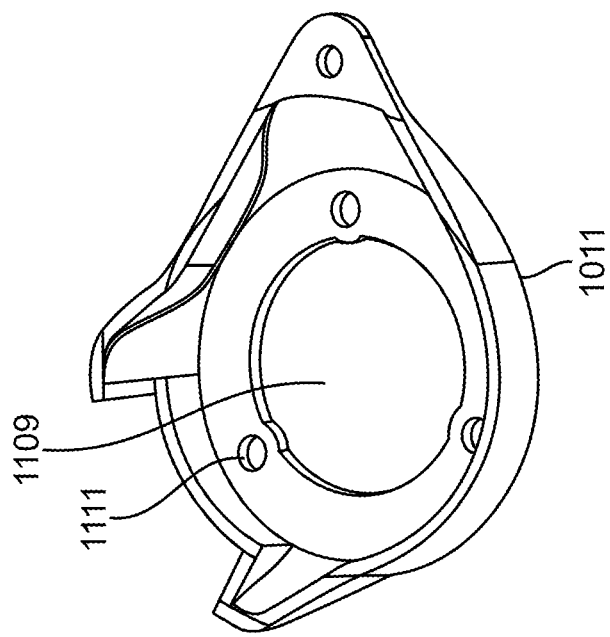
FIG. 11C illustrates a detailed view of a spline drive arm of the horizontal tail rotation mechanism, according to an embodiment.
Figure 12:
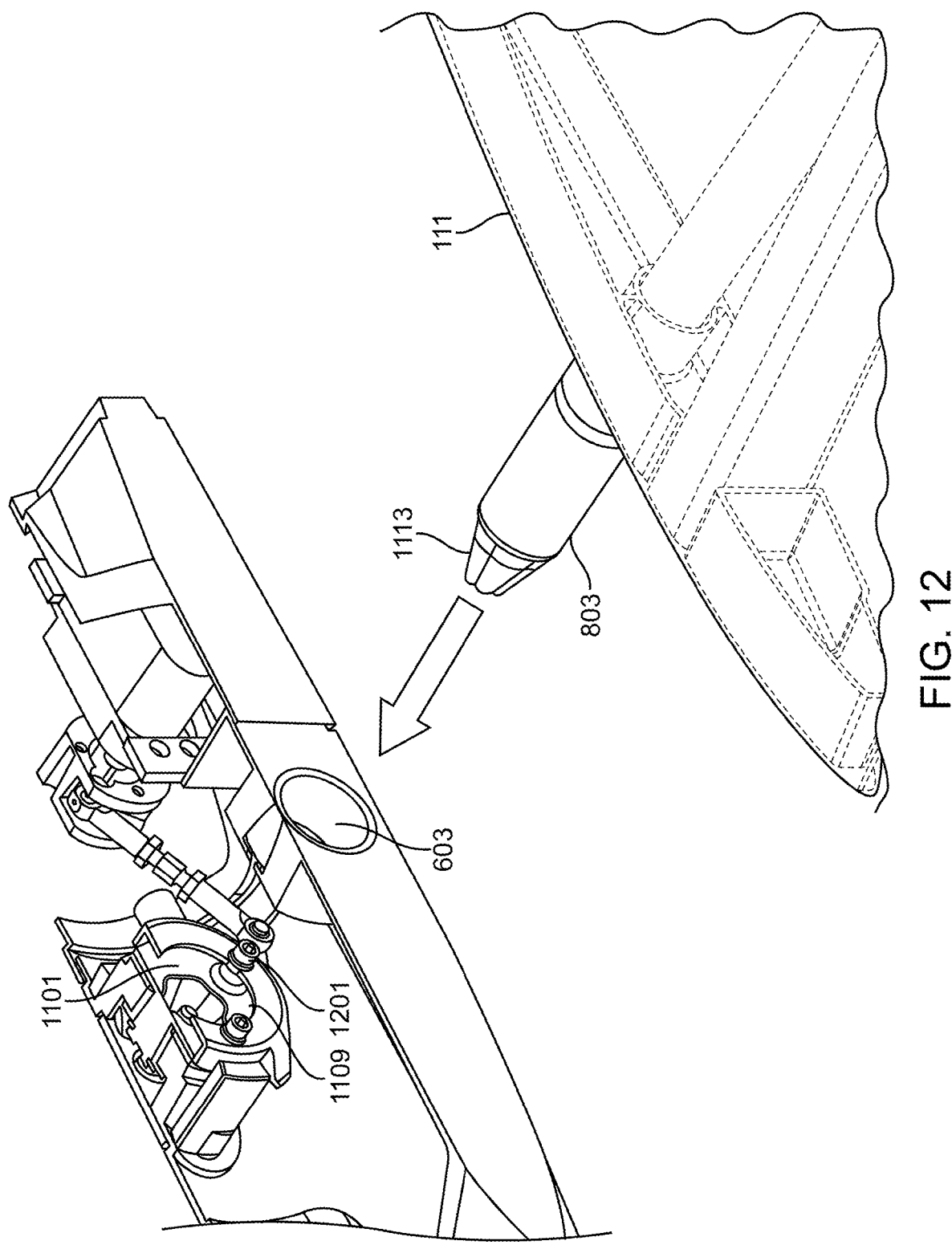
FIG. 12 illustrates a process for connecting the horizontal tail to the horizontal tail rotation mechanism, according to an embodiment.

The spline drive arm 1011 is another intermediate connection member positioned between the servo 1001 and the horizontal tail 111. The spline drive arm 1011 is configured to house the spline drive 1013. The spline drive arm 1011 includes a hole 1109 (shown in FIG. 11C) through a thickness of the spline drive arm 1011. The spline drive 1013 is aligned with the hole 1109 and the spline drive 1013 is connected to the spline drive arm 1011 via fasteners as shown in FIG. 12 and further described below. The spline drive arm 1011 is configured to rotate and the spline drive 1013 also rotates in accordance with the rotation of the spline drive arm 1011. As shown in FIG. 10, the spline drive arm 1011 is connected to the linkage 1000 (e.g., to the heim joint 1009B). As the servo 1001 rotates, the servo arm 1007 and the linkage 1009 rotate thereby causing the spline drive arm 1011 and the spline drive 1013 to also rotate.

Figure 11B:
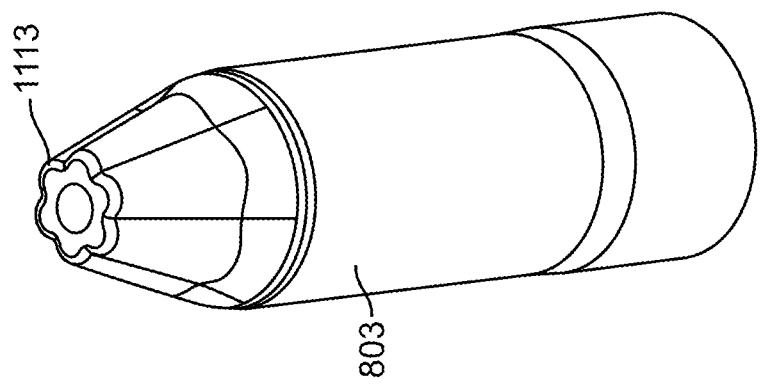
FIG. 11B illustrates a detailed view of an axle of the horizontal tail of the drone, according to an embodiment.
Figure 11A:
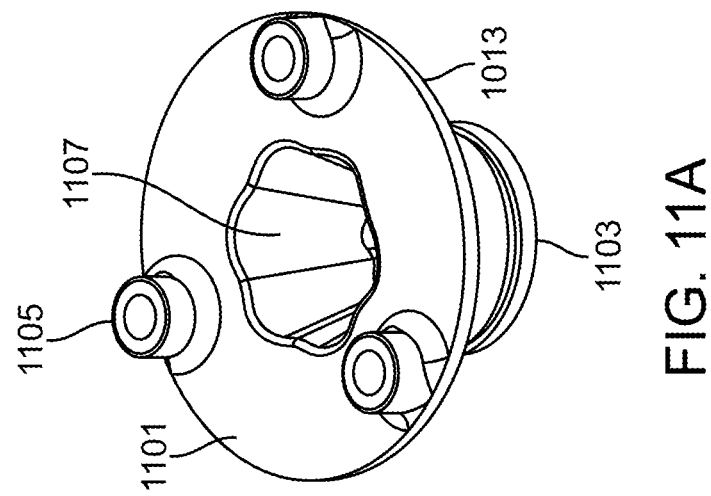
FIG. 11A illustrates a detailed view of a spline drive of the horizontal tail rotation mechanism according to an embodiment.

Referring to FIGS. 10, 11A, 11B, 11C, and 12 detailed views of the spline drive 1013, the axle 803 of the horizontal tail 111, and the spline drive arm 1011 are shown according to one embodiment. In one embodiment, the spline drive 1013 includes a first end 1101 and a second end 1103 as shown in FIG. 11A. The first end 1103 of the spline drive 1013 includes a plurality of mounting holes 1105. The plurality of mounting holes 1105 are threaded for example.

The spline drive arm 1011 includes the hole 1109 through a center of the spline drive arm 1011. The spine drive arm 1011 further includes a plurality of mounting holes 1111 that have a smaller diameter than the hole 1109. The plurality of mounting holes 1111 of the spline drive arm 1011 are configured to align with the plurality of mounting holes on the first end of the spline drive 1013. Fasteners (e.g., bolts) 1201 are inserted through the mounting holes 1111 of the spline drive arm 1011 and the mounting holes 1105 of the spline drive 1013 to connect together the spline drive arm 1011 and the spline drive 1013 as shown in FIG. 12. In one embodiment, the spline drive 1013 includes a cavity at a center of the spline drive 1013. The cavity includes a plurality of spline grooves (e.g., female splines) 1107 as shown in FIG. 11A. The spline grooves 1107 extend from the first end 1101 of the spline drive 1013 to the second end 1103 of the spline drive 1013. In one embodiment, the spline grooves 1107 taper from the first end 1101 of the spine drive 1013 to the second end 1103 of the spline drive 1013 thereby forming a cone-like shape.

Referring to FIG. 11B, the axle 803 of the horizontal tail 111 includes a plurality of spline protrusions 1113 (e.g., male splines) at the end of the axle 803 in one embodiment. The spline protrusions 1113 match the spline grooves 1107 on the spline drive 1107. Thus, the spline protrusions 1113 taper from the base of the spline protrusions 1113 to the tip of the spline protrusions 1113 as shown in FIG. 11B. The taper of the spline protrusions 1113 matches the taper of the spline grooves 1107.

Referring to FIG. 12, the axle 803 is configured to be inserted through the axle hole 603 of the boom 105 and through the hole 1109 of the spline drive 1011 such that the spline protrusions 1113 are inserted into the spline grooves 1107 of the spline drive 1107. Once the spline protrusions 1113 contact the spline grooves 1107, the horizontal tail 111 is connected to the horizontal tail rotation mechanism 1000 and can be rotated.

FIGS. 13A and 13B illustrate different views of a horizontal tail 111 in different rotated (e.g., tilted) states according to one embodiment. As the servo 1001 rotates, the intermediate connection members also rotate as previously described above. As the intermediate connection members rotate, the axle 803 of the horizontal tail 111 also rotates thereby causing the horizontal tail 111 to rotate (e.g., tilt) in its entirety between different angles. Thus, the entire horizontal tail 111 rotates rather than a portion of the horizontal tail 111 rotating. In one embodiment, the horizontal tail 111 is configured to rotate up to 90 degrees from the non-rotated position of the horizontal tail 111.

Figure 14A:
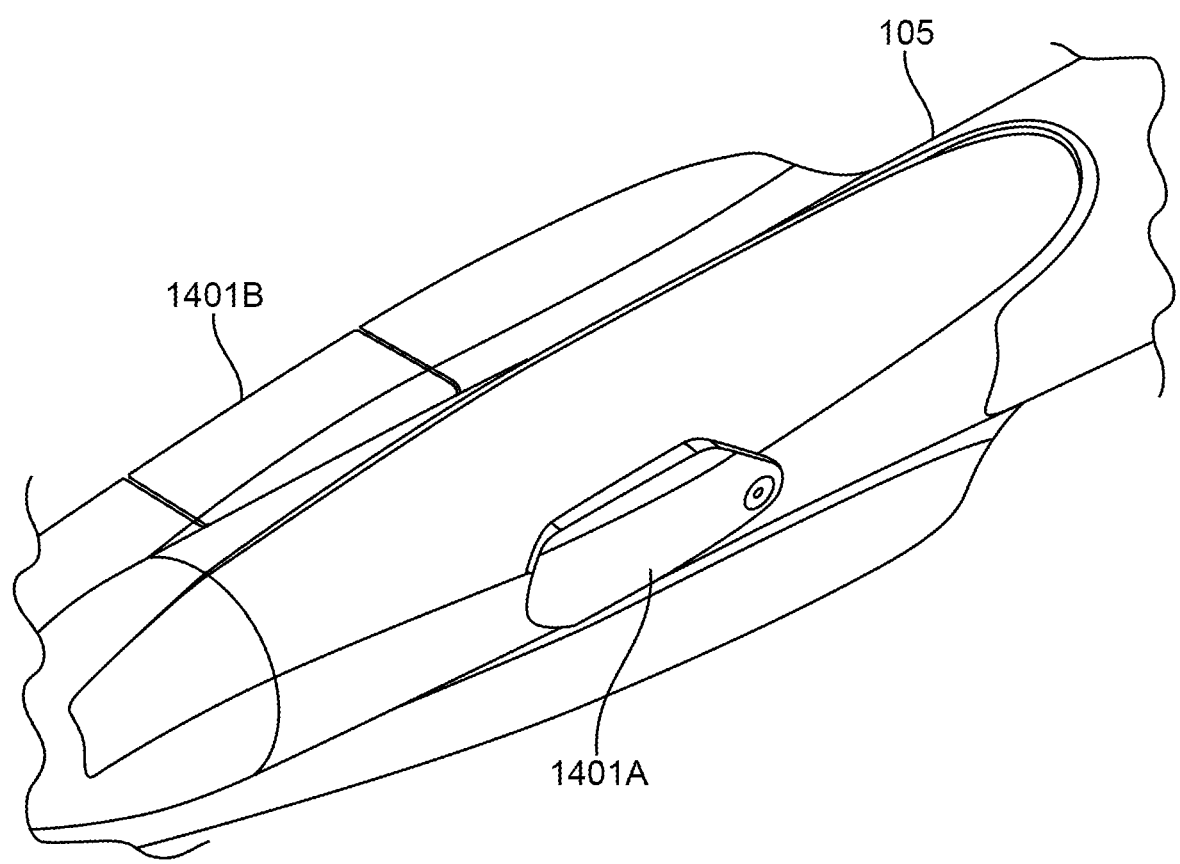
FIG. 14A illustrates a plurality of access covers in the boom to access the horizontal tail rotation mechanism, according to an embodiment.

As mentioned above, each horizontal tail rotation mechanism 1000 is housed within a respective boom 105. The horizontal tail rotation mechanism 1000 may periodically require service and/or adjustment. In one embodiment, each boom 105 includes a plurality of access panels 1401 shown in FIG. 14A. Each access panel 1401 is secured to an outer surface of the boom 105 via a fastener and is removable to gain access to a portion of the horizontal tail rotation mechanism 1000. In one embodiment, the access panels 1401 include a first access panel 1401A and a second access panel 1401B. The first access panel 1401A is located at one side of the boom 105 and the second access panel 1401B is located at another side of the boom 105.

Figure 14C:
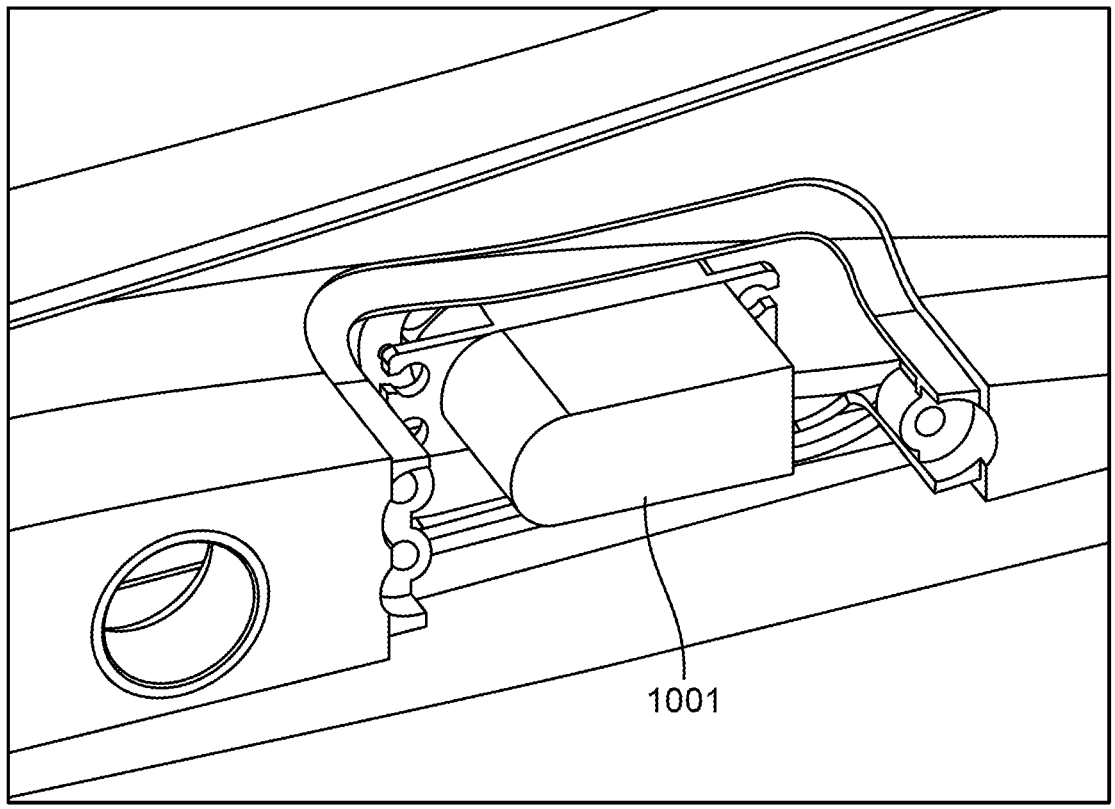
FIG. 14C illustrates a second portion of the horizontal tail rotation mechanism accessible through a second access cover, according to an embodiment.

In one embodiment, the first access panel 1401A is removable and exposes the linkage 1009 and the spline drive 1013 once the first access panel 1401A is removed as shown in FIG. 14B. The length of the linkage 1009 may be adjusted and/or the spline drive 1013 can be inspected via removal of the first access panel 1401A. In one embodiment, the second access panel 1401B is removal and exposes the servo 1001 once the second access panel 1401B is removed as shown in FIG. 14C.

Second Embodiment of Drone Structure

Figure 15:
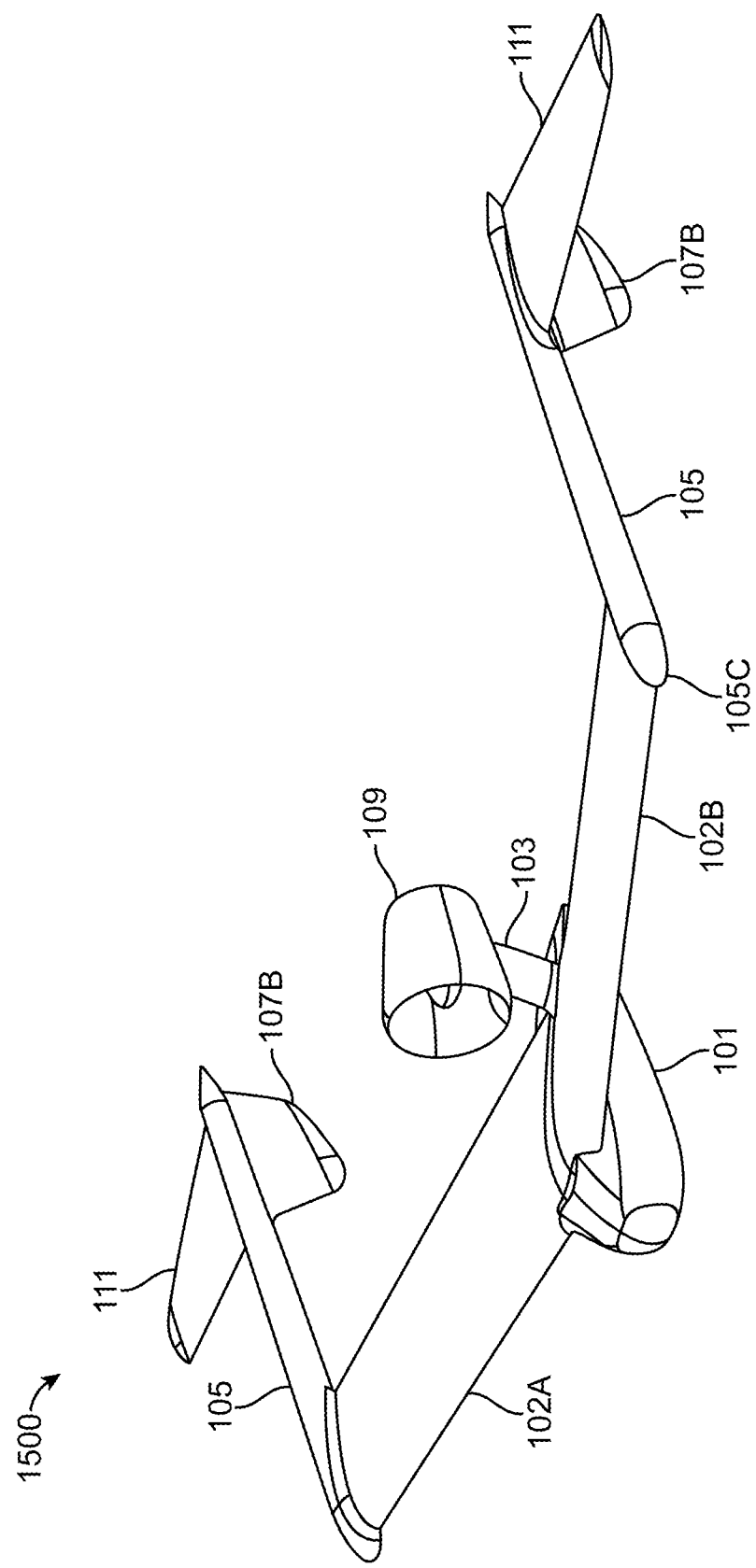
FIG. 15 shows a perspective view of a drone, according to another embodiment.

FIG. 15 illustrate a perspective view of a drone 1500 according to another embodiment. The drone 1500 includes similar components as the drone 100 previous described above. For example, drone 1500 includes comprises a fuselage 101, a main inboard wing 102, a pylon 103, a propulsor 109, a plurality of booms 105, a plurality of horizontal tails 111 (e.g., wings), and a plurality of vertical tails 107 (e.g., wings). However, in contrast to drone 100, drone 1500 includes two lower vertical tails 107B, but lacks the upper vertical tails 107A shown in drone 100.

Reference in the specification to "one embodiment" or to "an embodiment" means that a particular feature, structure, or characteristic is included in at least one embodiment of the disclosure. The appearances of the phrase "in one embodiment" in various places in the specification are not necessarily referring to the same embodiment.

While the disclosure has been particularly shown and described with reference to one embodiment and several alternate embodiments, it will be understood by persons skilled in the relevant art that various changes in form and details can be made therein without departing from the spirit and scope of the invention.

What is claimed is:

1. A aircraft comprising:
   a fuselage;
   a main inboard wing attached to an upper surface of the fuselage, the main inboard wing having a first end and a second end that is opposite the first end;
   a pylon located towards an aft end of the fuselage, the pylon having an end that extends from the upper surface of the fuselage such that the end of the pylon is positioned higher than the main inboard wing;
   a propulsor connected to the end of the pylon, the propulsor configured to generate thrust;
   a plurality of booms including a first boom and a second boom, the first boom attached to the first end of the main inboard wing and the second boom attached to the second end of the main inboard wing; and
   a plurality of horizontal tails including a first horizontal tail and a second horizontal tail, the first horizontal tail connected to a side surface of the first boom and extending outboard away from the propulsor, and the second horizontal tail connected to a side surface of the second boom and extending outboard away from the propulsor,
   wherein an entirety of each of the plurality of horizontal tails is configured to rotate;
   wherein the aircraft further includes a plurality of horizontal tail rotation mechanisms each configured to rotate a corresponding one of the plurality of horizontal tails, the plurality of horizontal tail rotation mechanisms including a first horizontal tail rotation mechanism located within the first boom and configured to rotate the first horizontal tail and a second horizontal tail rotation mechanism located within the second boom and configured to rotate the second horizontal tail.

2. The aircraft of claim 1, wherein the propulsor connected to the end of the pylon is a ducted propulsor positioned at a center of lift of the aircraft.

3. The aircraft of claim 1, wherein a height of the pylon above the main inboard wing is based on a diameter of the propulsor.

4. The aircraft of claim 3, wherein the height of the pylon is at least 30% of the diameter of the propulsor.

5. The aircraft of claim 1, wherein each of the first boom and the second boom includes a respective end that is located past the aft end of the fuselage.

6. The aircraft of claim 5, wherein the first horizontal tail is attached to the end of the first boom that is located past the aft end of the fuselage and the second horizontal tail is attached to the end of the second boom that is located past the aft end of the fuselage.

7. The aircraft of claim 6, wherein a first length of the first boom is such that the first horizontal tail is located at an upwash field of a vortex-roll up off of the main inboard wing around the first boom, and a second length of the second boom is such that the second horizontal tail is located at the upwash field of the vortex-roll up off of the main inboard wing around the second boom.

8. The aircraft of claim 6, further comprising:
   a first plurality of vertical tails connected to the end of the first boom, the first plurality of vertical tails including a first vertical tail that extends in an upward direction from an upper surface of the first boom and a second vertical tail that extends in a downward direction from a lower surface of the first boom that is opposite the upward direction; and
   a second plurality of vertical tails connected to the end of the second boom, the second plurality of vertical tails including a third vertical tail that extends in the upward direction from an upper surface of the second boom and a fourth vertical tail that extends in the downward direction from a lower surface of the second boom that is opposite the upward direction,
   wherein the first vertical tail and the third vertical tail comprises a rudder and the second vertical tail and fourth vertical tail each lack the rudder.

9. The aircraft of claim 6, further comprising:
   a plurality of vertical tails including a first vertical tail and a second vertical tail,
   wherein the first vertical tail is attached to a lower surface of the first boom and extends in a downward direction from the lower surface of the first boom, and the second vertical tail is attached to a lower surface of the second boom and extends in the downward direction from a lower surface of the second boom.

10. The aircraft of claim 1, wherein the first horizontal tail comprises an anhedral or a dihedral with respect to the first boom and the second horizontal tail comprises the anhedral or the dihedral with respect to the second boom.

11. The aircraft of claim 1, wherein the first horizontal tail includes a first connection surface configured to contact the first boom and a first axle that protrudes from the first connection surface, and the second horizontal tail includes a second connection surface configured to contact the second boom and a second axle that protrudes from the second connection surface.

12. The aircraft of claim 11, wherein each of the first horizontal tail rotation mechanism and the second horizontal tail rotation mechanism comprises:
- a mount attached to an inner surface of a respective boom, the mount including a cavity;
- a servomechanism located in the cavity of the mount, the servomechanism including an output shaft that is configured to rotate;
- a servo arm configured to rotate about the output shaft, the servo arm including a hole and the output shaft of the servomechanism is inserted into the hole of the servo arm such that the servo arm rotates as the output shaft rotates;
- a linkage having a first end and a second end, the first end of the linkage connected to the servo arm such that the linkage is configured to rotate about the output shaft as the servo arm rotates;
- a spline drive arm connected to the second end of the linkage and including a hole, the spline drive arm configured to rotate as the linkage rotates about the output shaft; and
- a spline drive inserted in the hole of the spline drive arm, the spline drive configured to rotate as the spline drive arms rotates.

13. The aircraft of claim 12, wherein the spline drive includes a cavity having a plurality of spline grooves and each of the first axle and the second axle includes a plurality of spline protrusions at an end of the first axle and the second axle that match the plurality of spline grooves.

14. The aircraft of claim 13, wherein the first boom includes a first axle hole through a thickness of the first boom and the second boom includes a second axle hole through a thickness of the second boom,
wherein the first axle is configured to be inserted into the first axle hole and the hole of a respective spline drive arm such that the plurality of spline protrusions of the first axle are inserted into the plurality of spline grooves of the respective spline drive, and
wherein the second axle is configured to be inserted into the second axle hole and the hole of a respective spline drive arm such that the plurality spline protrusions of the second axle are inserted into the plurality of spline grooves of the respective spline drive.

15. The aircraft of claim 13, wherein the plurality of spline protrusions of each of the first axle and the second axle taper towards an end of the respective axle, and the plurality of spline grooves of each respective spline drive tapers from a first end of the respective spline drive to a second end of the respective spline drive.

16. The aircraft of claim 12, wherein the servo arm further comprises a slot that extends from a first end if the slot that is adjacent to the hole in the servo arm to a second end of the slot that is located towards an end of the servo arm,
wherein the first end of the linkage is connected to the servo arm via the slot and a degree of rotation of the respective tail is adjustable based on a position of connection of the first end of the linkage along the slot.

17. The aircraft of claim 12, wherein each of the first boom and the second boom includes a plurality of access covers that are configured to be removed from the first boom and the second boom to expose different portions of the first horizontal tail rotation mechanism and the second horizontal tail rotation mechanism.

18. The aircraft of claim 1, wherein the fuselage includes a nose configured to house a payload including at least one of a camera, radar, lidar, audio sensors, vibration sensors, intelligence, surveillance, reconnaissance (ISR) equipment, directional microphones, or a combination thereof.

19. The aircraft of claim 1, wherein each of the first boom and the second boom comprises:
- a main body having a first end and a second end opposite the first end;
- a nose cone attached to the first end of the main body; and
- a tail cone attached to the second end of the main body,
wherein a portion of the nose cone and a portion of the main body are connected to a respective end of the main inboard wing.

20. The aircraft of claim 19, wherein the nose cone is configured to house a payload including at least one of a camera, radar, lidar, audio sensors, vibration sensors, intelligence, surveillance, reconnaissance (ISR) equipment, directional microphones, or a combination thereof.

* * * * *